US008816558B2

(12) United States Patent
Sears et al.

(10) Patent No.: US 8,816,558 B2
(45) Date of Patent: Aug. 26, 2014

(54) INSULATOR FOR STATOR ASSEMBLY OF BRUSHLESS DC MOTOR

(71) Applicant: ResMed Motor Technologies Inc., Chatsworth, CA (US)

(72) Inventors: David B. Sears, Woodland Hills, CA (US); Michael Bruce Moir, Newbury Park, CA (US); Peter Jeffrey Thomas, Sylmar, CA (US)

(73) Assignee: ResMed Motor Technologies Inc, Chatsworth, CA (US)

( * ) Notice: Subject to any disclaimer, the term of this patent is extended or adjusted under 35 U.S.C. 154(b) by 0 days.

(21) Appl. No.: 13/895,653

(22) Filed: May 16, 2013

(65) Prior Publication Data

US 2013/0259674 A1    Oct. 3, 2013

Related U.S. Application Data

(62) Division of application No. 12/310,437, filed as application No. PCT/US2007/019170 on Aug. 31, 2007, now Pat. No. 8,450,898.

(60) Provisional application No. 60/929,867, filed on Jul. 16, 2007, provisional application No. 60/841,564, filed on Sep. 1, 2006.

(51) Int. Cl.
*H02K 3/34* (2006.01)
*H02K 3/50* (2006.01)
*H02K 1/18* (2006.01)

(52) U.S. Cl.
USPC .......................................... 310/194; 310/215

(58) Field of Classification Search
CPC ............. H02K 1/16; H02K 1/18; H02K 3/32; H02K 3/34; H02K 3/50
USPC .................................... 310/194, 214–215, 71
IPC ..................... H02K 1/16, 1/18, 3/32, 3/34, 3/50
See application file for complete search history.

(56) References Cited

U.S. PATENT DOCUMENTS

| 4,818,911 | A | 4/1989 | Taguchi et al. |
| 5,828,147 | A | 10/1998 | Best et al. |
| 5,895,994 | A | 4/1999 | Molnar et al. |
| 5,949,613 | A | 9/1999 | Moir et al. |
| 6,822,364 | B2 | 11/2004 | Suzuki et al. |
| 6,856,055 | B2 * | 2/2005 | Michaels et al. ................. 310/71 |
| 6,910,483 | B2 * | 6/2005 | Daly et al. ................ 128/204.26 |
| 6,949,848 | B2 * | 9/2005 | Yamada et al. .................. 310/71 |

(Continued)

OTHER PUBLICATIONS

International Search Report, PCT/US2007/019170, dated Jan. 22, 2008.

(Continued)

*Primary Examiner* — Michael Andrews
(74) *Attorney, Agent, or Firm* — Nixon & Vanderhye P.C.

(57) ABSTRACT

An insulator for a stator assembly includes at least a first insulator adapted to be mounted to the stator core and structured to insulate the stator core from the coils. The at least one insulator includes structure to perform at least one additional function. For example, the structure may include a support member to support and/or locate the PCBA on the stator core, a wire guide to guide cross-over wires that form a connection between coils, and/or positioning structure to precisely position the PCBA with respect to the coils.

18 Claims, 30 Drawing Sheets

(56) References Cited

U.S. PATENT DOCUMENTS

| | | |
|---|---|---|
| 7,120,985 B2 | 10/2006 | Nouzumi |
| 7,262,540 B2 | 8/2007 | Lee |
| 7,342,334 B2 | 3/2008 | Hilton et al. |
| 2004/0119350 A1 | 6/2004 | Miya et al. |
| 2004/0164641 A1* | 8/2004 | Yamada et al. ............... 310/194 |
| 2005/0067914 A1 | 3/2005 | Baba et al. |
| 2005/0103339 A1 | 5/2005 | Daly et al. |
| 2006/0043802 A1* | 3/2006 | Sugiyama et al. .......... 310/67 R |
| 2009/0324435 A1 | 12/2009 | Sears et al. |

OTHER PUBLICATIONS

U.S. Appl. No. 60/730,875, filed Oct. 2005, Kenyon et al.
U.S. Appl. No. 60/775,333, filed Feb. 2006, Kenyon.

\* cited by examiner

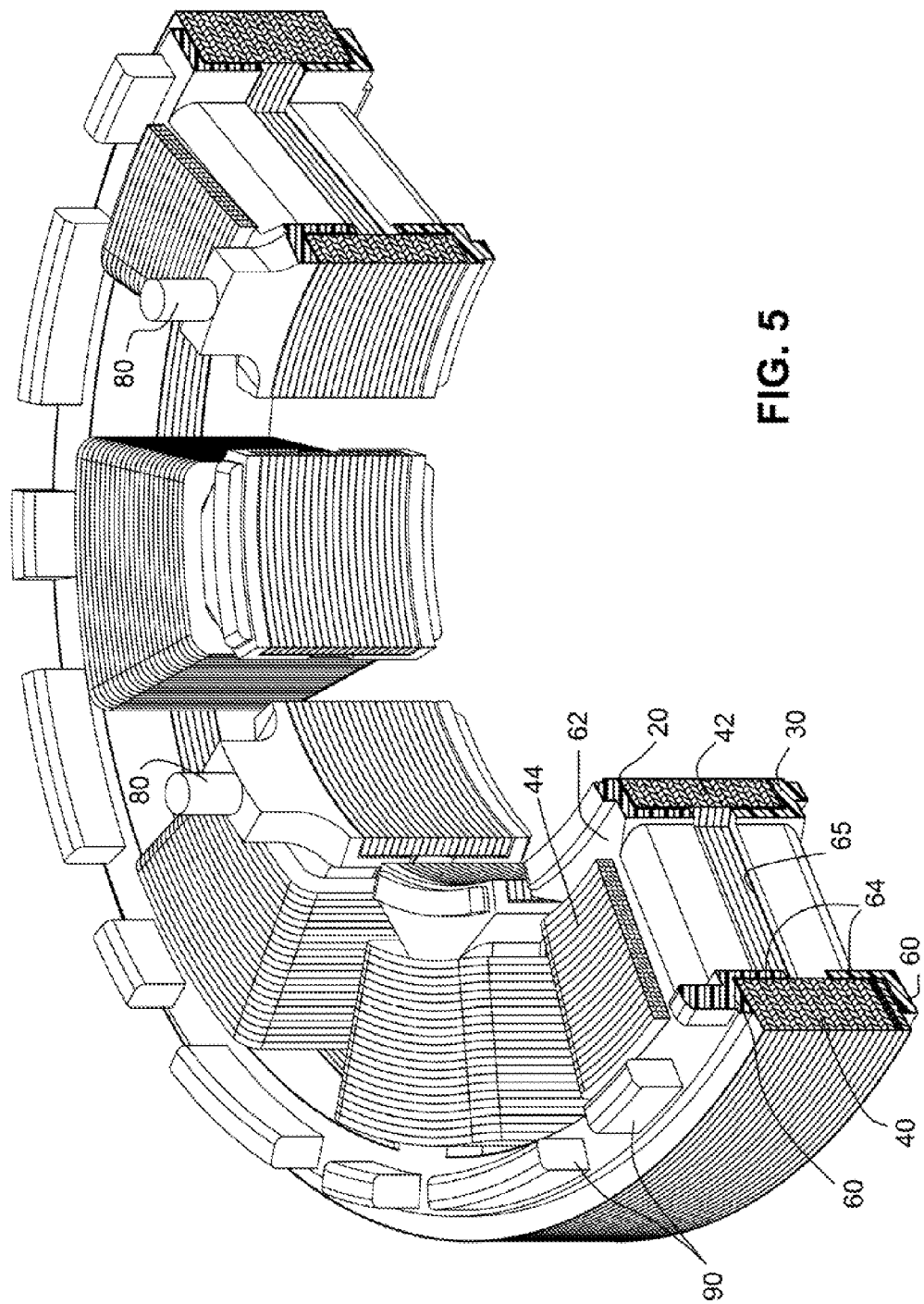

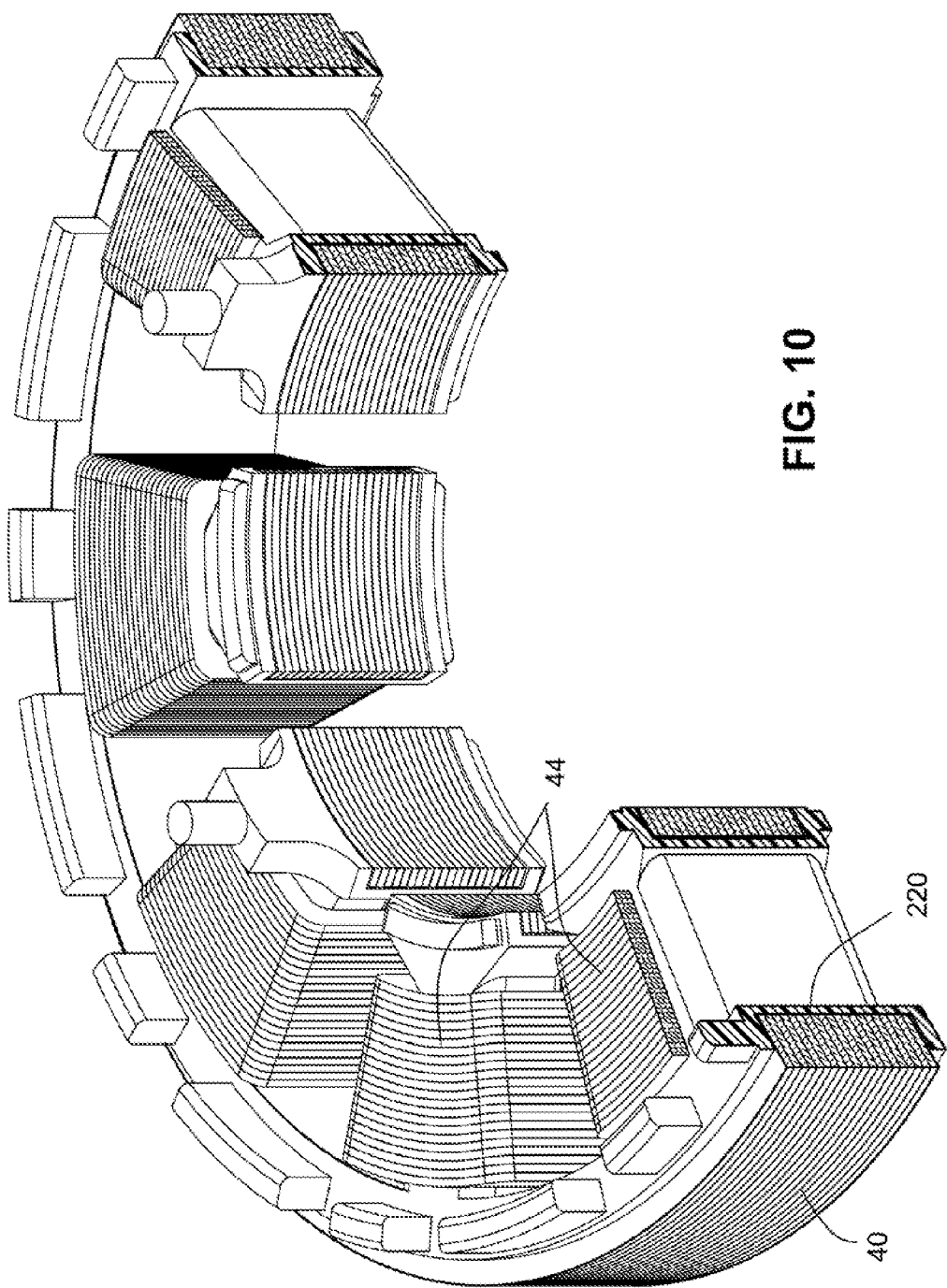

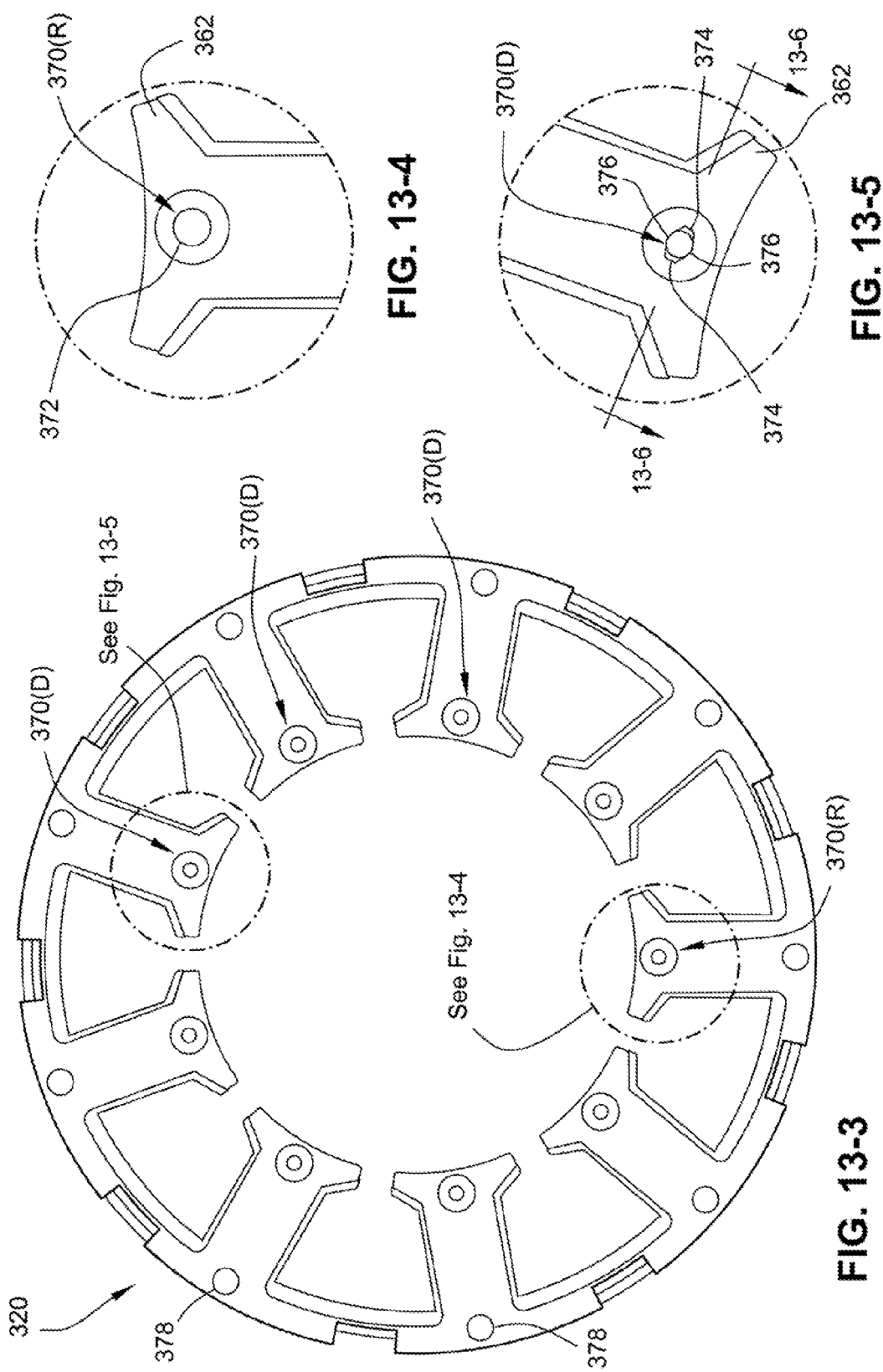

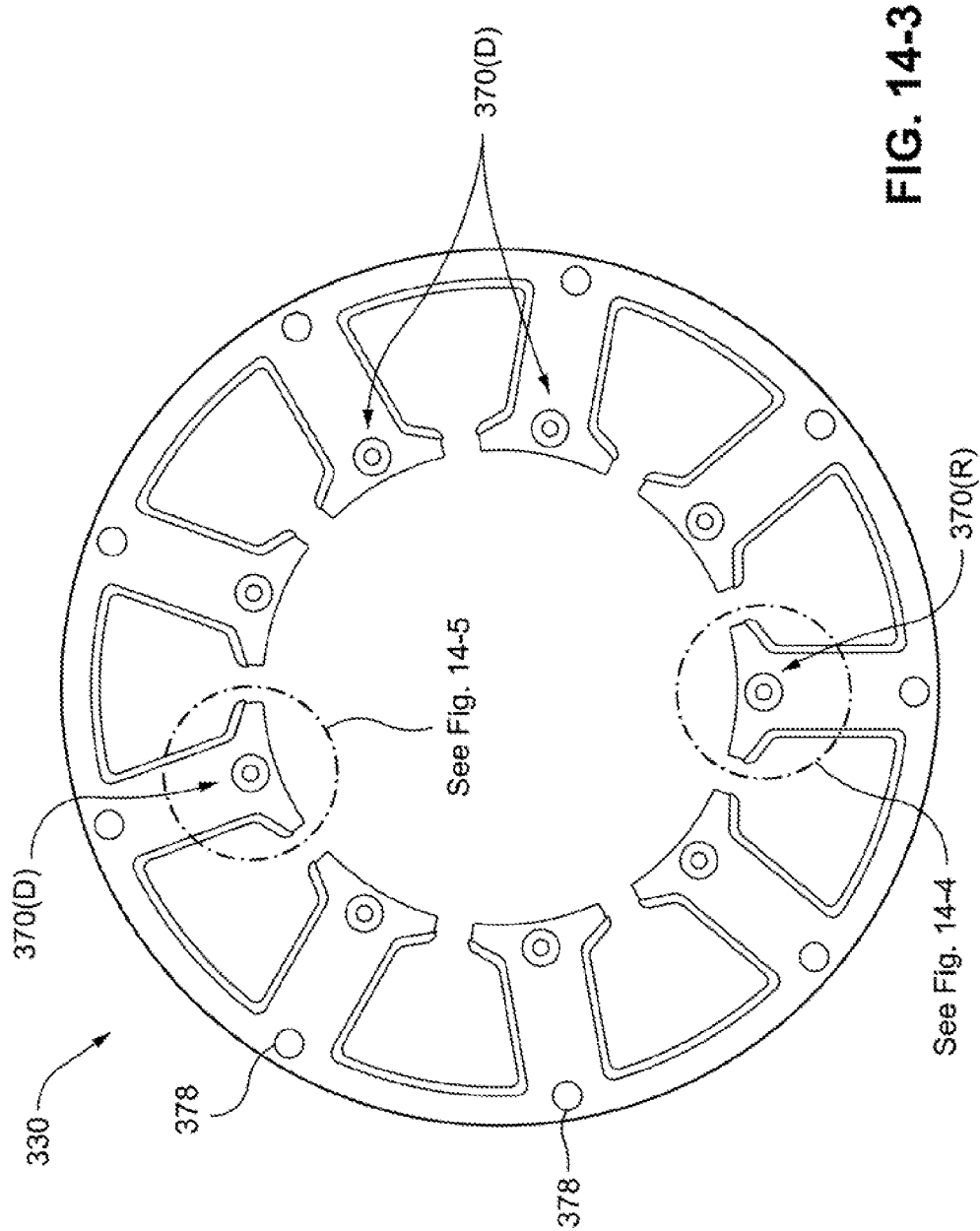

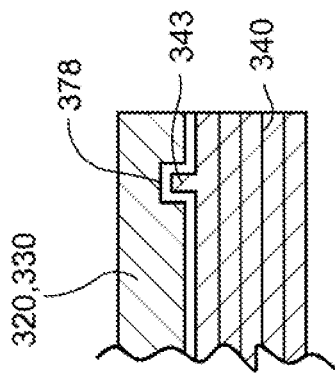
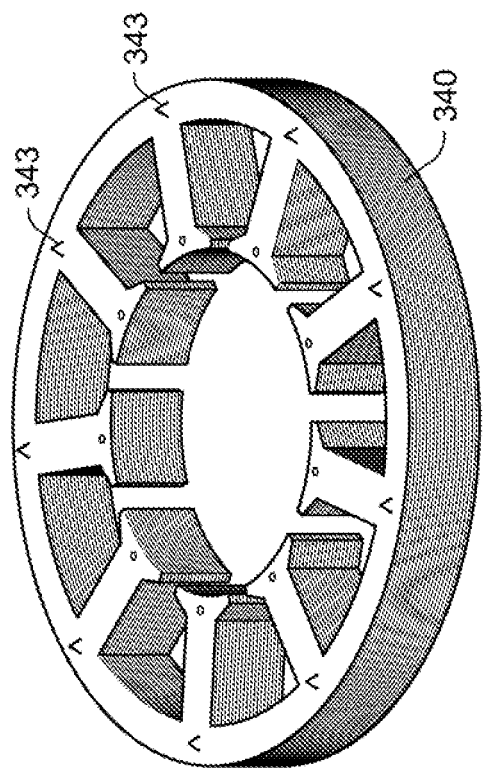
FIG. 15-2
FIG. 15-1

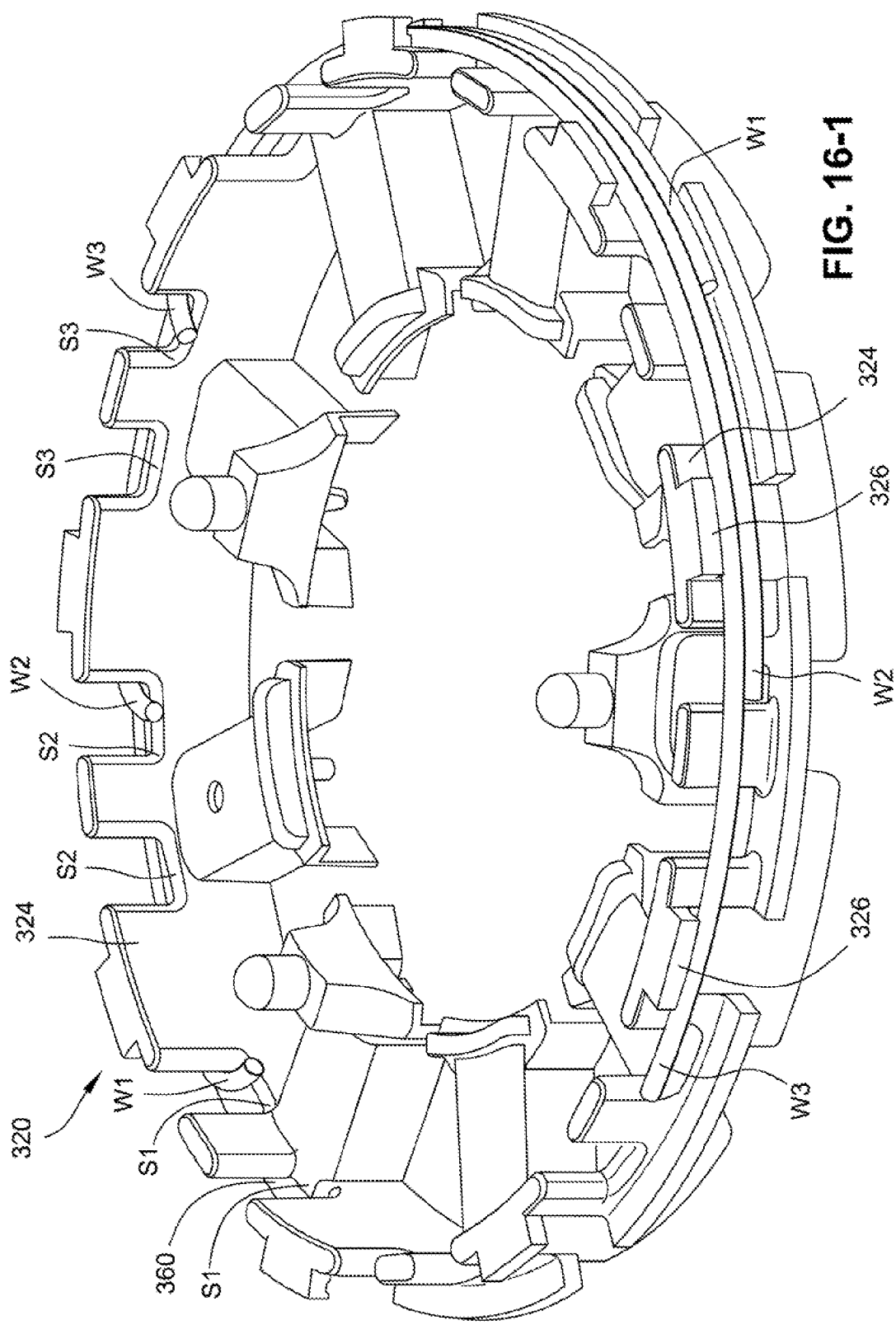

INSULATOR FOR STATOR ASSEMBLY OF BRUSHLESS DC MOTOR

CROSS-REFERENCE TO APPLICATIONS

This application is a divisional of U.S. patent application Ser. No. 12/310,437, filed Feb. 25, 2009, allowed, which is the U.S. National Phase of International Application No. PCT/US2007/019170, filed Aug. 31, 2007, which designated the U.S. and claims the benefit of U.S. Provisional Application Nos. 60/841,564, filed Sep. 1, 2006, and 60/929,867, filed Jul. 16, 2007, each of which is incorporated herein by reference in its entirety.

Also, U.S. Provisional Application Nos. 60/730,875, filed Oct. 28, 2005, and 60/775,333, filed Feb. 22, 2006, are each incorporated herein by reference in its entirety.

FIELD OF THE INVENTION

The present invention relates to electric motors, and more particularly to an insulator for a stator assembly of an electric motor. The present invention also relates to electric blowers, e.g., positive airway pressure (PAP) devices or flow generators used for treatment of Sleep Disordered Breathing (SDB) with Non-Invasive Positive Pressure Ventilation (NIPPV). Of course, the teachings herein also have general application to electric motors in virtually any technical application.

BACKGROUND OF THE INVENTION

A need has developed in the art for motor designs that are more compact and less expensive. Motor design includes the following considerations: insulation is required on the stator; a printed circuit board assembly (PCBA) must be positioned "accurately" with respect to the stator windings; magnetic wiring should be inserted into a stator in the most orderly fashion possible to minimize resistance and coil volume; and material and labor costs should be minimized. However, achieving each of these functions separately drives up cost and complexity in the manufacturing process.

Conventional approaches to the foregoing are not optimal solutions when a PCBA is to be accurately positioned on the stator. For example, with respect to insulation, for safety purposes, the stator is twice insulated from the magnetic wiring that is wound into them, i.e., once by the insulation carried on the outer surface of the magnetic wiring itself and again by an insulating barrier applied between the stator and the insulated magnet wire.

In low to medium volume manufacturing settings, the stator is commonly insulated by any of several means, e.g., conformal films, paper strips (e.g., Nomex), tapes and molded slotliners. Each of these is useful as an insulator, however, there is no mechanical purpose served, i.e., they are only insulators. For example, known insulators include the primary function of being form fitting to the stator core and being made of an insulating material, without the provision for other functions.

With respect to PCBA mounting, in connection with a brushless direct current (BLDC) motor, the PCBA contains components that facilitate BLDC motor operation (e.g., one or more Hall sensors, Thermal Sensors, leadwire connections, etc.). Such components are usually attached to a proximal element of the motor assembly, such as the motor housing, endcap, or bracket. While these approaches all function for the intended purpose, they may not be optimal in terms of cost and compactness.

With respect to magnetic wiring guidance, known approaches very often do not provide wire guidance and the randomness of the "lay" of the magnetic wiring is accepted as part of the process. A random wire lay takes more space and has higher resistance and less coil integrity than one that is neatly organized.

Thus, a need has developed in the art for an improved arrangement that does not suffer from one or more of the above-mentioned drawbacks.

SUMMARY OF THE INVENTION

One aspect of the present invention relates to an insulator for a stator assembly of an electric motor that is structured to provide stator or stator core (lamination stack) insulation, PCBA mounting and positioning, and/or magnetic wiring guidance.

Another aspect of the present invention relates to an insulator for a stator assembly including a stator core having a plurality of teeth, coils wound around the teeth, and a PCBA. The insulator includes at least one insulator adapted to be mounted to the stator core and structured to insulate the stator core from the coils. The at least one insulator includes structure or features to perform at least one additional function. For example, the structure or features may include features to support and/or locate the PCBA on the stator core, guide features that guide cross-over wires that form a connection between coils, and/or positioning features to precisely position the PCBA and its attendant components accurately with respect to the coils.

Another aspect of the present invention relates to an insulator for a stator assembly including a stator core having a plurality of teeth, coils wound around the teeth, and a PCBA. The insulator includes at least a first insulator adapted to be mounted to the stator core and structured to insulate the stator core from the coils. The first insulator includes features to support and/or locate the PCBA on the stator.

Another aspect of the present invention relates to an insulator for a stator assembly including a stator core having a plurality of teeth, coils wound around the teeth, and a PCBA. The insulator includes at least a first insulator adapted to be mounted to the stator core and structured to insulate the stator core from the coils. The first insulator includes a guide wall structured to guide cross-over wires that form a connection between coils.

Another aspect of the present invention relates to a method for manufacturing a stator assembly. The method includes providing a stator core including a plurality of teeth, providing an insulator to the stator core to insulate the stator core, and guiding wiring around the teeth, at least in part, via the insulator. The insulator geometry may be helpful for shaping the individual coils, in that the bending radii at the corners of the teeth are controlled, at least in part, by radii of insulator petals. The insulator may have one or more guide walls or ridges at its outer periphery to guide the cross-over wires that form the connection between coils.

Another aspect of the present invention relates to a method for manufacturing a stator assembly. The method includes providing a stator core including a plurality of teeth, providing at least one insulator to the stator core to insulate the stator core, and mounting a PCBA to the at least one insulator.

Another aspect of the present invention relates to PC Board "down" assembly and method for assembling a motor. For example, an aspect of the present invention relates to a method for assembling a motor assembly, including providing a stator core, providing an insulator to the stator core, attaching a PCBA to the insulator to provide a stator assembly, inserting a PCBA side of the stator assembly into a housing with the PCBA oriented downwardly (i.e., PCBA is opposite the housing opening), inserting a rotor into the housing and into an operative position with respect to the stator assembly, and attaching an end wall (or "end cap" or "end bell") to the housing to enclose the stator assembly and rotor within the housing.

Another aspect of the present invention relates to a motor assembly including a housing including a first end wall and a second, removable end wall, a stator assembly including a PCBA provided to one side thereof, and a rotor operative positioned with respect to the stator assembly. The stator assembly is provided to the housing such that the PCBA is positioned adjacent the first end wall. The rotor is adapted to be removed from the stator assembly via removal of the second end wall while the stator assembly is maintained within the housing.

Another aspect of the present invention relates to a method for manufacturing a motor assembly. The method includes removing a cylindrical portion from a stator core to form an inner cylindrical space in the stator core and forming the removed cylindrical portion into a rotor hub that is adapted to be accommodate a magnet or magnets, which assembly is, in turn, to be received in the inner cylindrical space of the stator core.

Another aspect of the present invention relates to a method for insulating a stator assembly including a stator core having a plurality of teeth and coils wound around the teeth. The method includes providing first and second insulators to opposing first and second sides of the stator core, respectively, to insulate the stator core from the coils.

Other aspects of the invention relate to an insulator integrally molded with the stator core with the same functionality for mounting a PCBA that interacts via a magnetic field with the optionally laminated rotor, cylindrical magnet optionally overhanging the rotor hub and provided with Hall sensors, thermal sensors, etc., wire routing thru-slot for packaging and strain relief (to insulate and help protect the solder joint from strain), "plate through" feature at edge of PCB, and/or steel sleeve on outer diameter of rotor magnet (for increased mechanical integrity).

Another aspect of the invention relates to a brushless DC motor having a stator core including a plurality of laminations that are stacked on one another and affixed to one another, e.g., using adhesives or other lamination techniques. In an embodiment, the laminations are steel or metal alloy laminations.

Other aspects, features, and advantages of this invention will become apparent from the following detailed description when taken in conjunction with the accompanying drawings, which are a part of this disclosure and which illustrate, by way of example, principles of the invention.

BRIEF DESCRIPTION OF THE DRAWINGS

The accompanying drawings facilitate an understanding of the various embodiments of this invention. In such drawings:

FIG. 5 is a cross-sectional view through line 5-5 in FIG. 4;

FIGS. 10-1 to 10-3 illustrate an insulator provided to a stator core according to another embodiment of the present invention;

FIGS. 13-1 to 13-9 are various views of a first insulator according to another embodiment of the present invention;

FIGS. 14-1 to 14-8 are various views of a second insulator according to another embodiment of the present invention;

FIGS. 15-1 to 15-2 illustrate a stator core with dimples and an insulator including depressions adapted to receive respective dimples according to an embodiment of the present invention;

FIGS. 16-1 to 16-4 are various views of the first insulator shown in FIGS. 13-1 to 13-9 illustrating structure to guide intra-phase or other cross-over wires according to an embodiment of the present invention;

FIG. 16-5 is a schematic view illustrating coil sets and respective cross-over wires;

FIGS. 17-1 to 17-2 illustrate PCBA mounting to an insulator according to another embodiment of the present invention.

DETAILED DESCRIPTION OF ILLUSTRATED EMBODIMENTS

FIGS. 1-9 illustrate a stator assembly 10 including an insulator having first and second insulators 20, 30 according to an embodiment of the present invention. In the illustrated embodiment, the stator assembly 10 is implemented into an electric motor in the form of a brushless DC motor (see FIG. 11).

Figure 11:
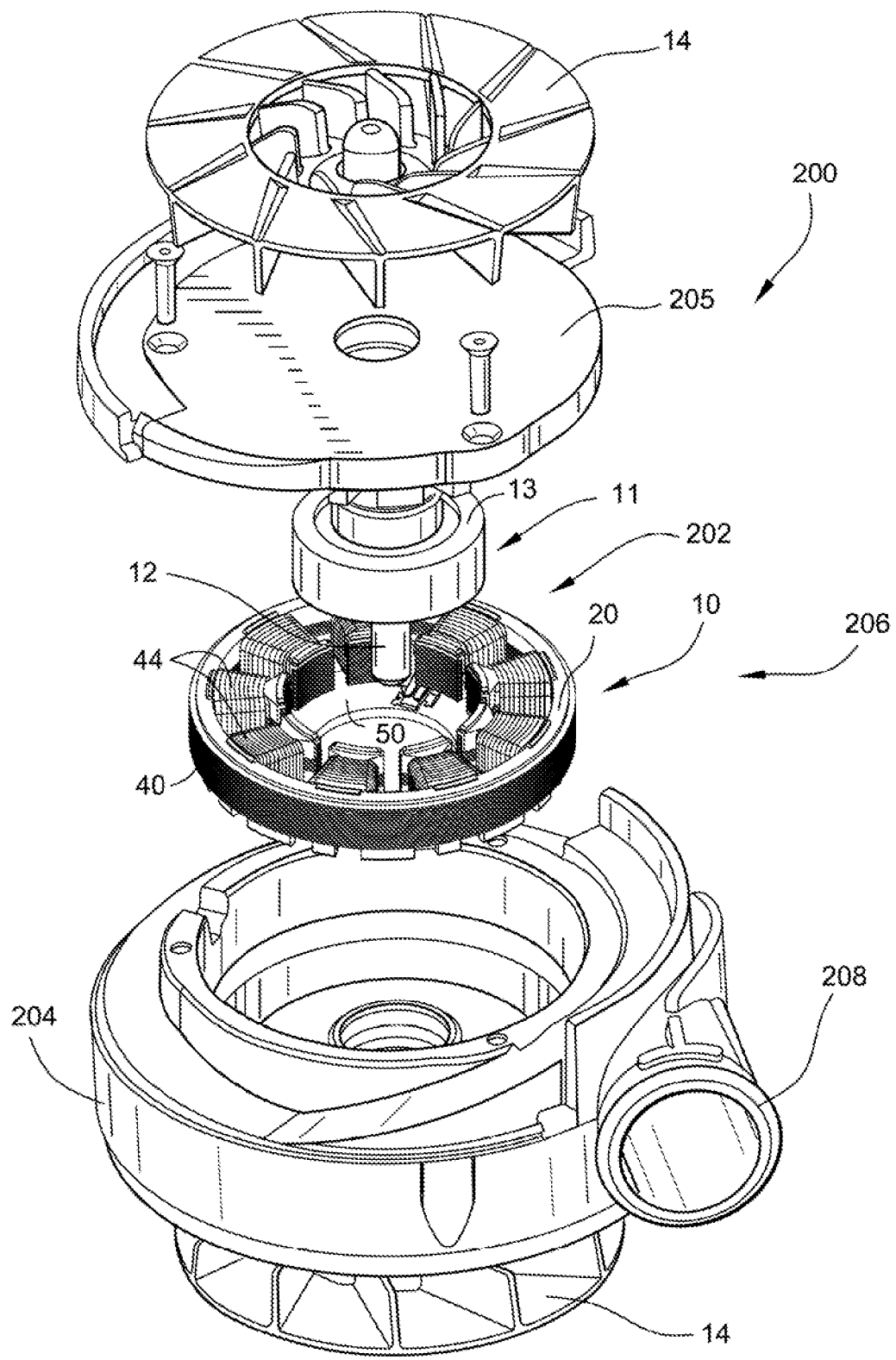
FIG. 11 is an exploded view of a flow generator motor assembly including an electric motor according to an embodiment of the present invention.

As best shown in FIG. 11, the stator assembly 10 is adapted to surround a rotor 11 having a shaft 12 and a magnet 13 having a plurality of magnetic poles. In an embodiment, a steel sleeve may be provided to an outer diameter of the magnet for increased mechanical integrity. One or both end portions of shaft 12 are adapted to be coupled to or provided with a respective impeller 14 to pressurize gas received from an intake. In use, an electronic controller (typically provided as part of PAP devices or flow generators available from ResMed) controls operation of the motor to control spinning movement of the rotor 11 and hence the load, e.g., impeller 14.

1.0 Insulators

As best shown in FIGS. 1 and 3-9, the stator assembly 10 includes a stator or stator core 40 having a plurality of stator teeth 42, e.g., nine stator teeth (for use with a three phase motor), on which stator coils or windings 44 are wound. First and second insulators 20, 30 (also referred to as slot insulators or slot liners) are provided on opposing sides of the stator core 40 to insulate the stator core 40 from the stator coils 44. A printed circuit board assembly (PCBA) 50 is mounted to one of the insulators, the first insulator 20, and may contain Hall sensors to sense the position of rotor 11 and thereby assist in controlling the spinning movement of the rotor 11 and hence the load, e.g., impeller 14. The PCBA may contain other useful devices, e.g., thermal sensors.

As best shown in FIGS. 1 and 5-9, the stator core 40 includes a plurality of laminations, e.g., 2-100 laminations or more, that are stacked on top of one another. The number of laminations may depend on the power requirement. In the example shown, the stator core 40 includes about 15-30 laminations that are stacked on one another and affixed to one another using adhesives or other techniques. However, the stator core 40 can have a different arrangement (e.g., solid member not having a "stack" of laminations).

As described in greater detail below, the first and/or second insulators 20, 30 provide one or more functions. Specifically, the first and/or second insulators 20, 30 are structured to insulate the stator core 40, provide mounting for the PCBA 50, position the PCBA 50 precisely with respect to the stator coils 44, and help to guide the magnetic wiring of the stator coils 44 during stator coil winding. Thus, the first and second insulators 20, 30 serve useful purposes beyond simply insulating and this arrangement enables a more compact and cost-effective motor design. Additional functions are described herein.

1.1 Stator Core Insulation

In an embodiment, each insulator 20, 30 is molded of a liquid crystal polymer (LCP), which is selected for its mechanical properties and for its free flowing characteristics during molding to facilitate thin walled features so as not to consume slot area in the stator. As illustrated, each insulator 20, 30 includes a main wall 60 that provides a plurality of teeth or petals 62, e.g., nine petals. The number of petals 62 corresponds to the number stator teeth 42 provided on the stator core 40. Side walls 64 extend from the main wall 60 along the slots that separate the petals 62. The side walls 64 ensure that there is no direct contact between the magnetic wiring and the stator core 40.

As best shown in FIGS. 1, 2, and 6-9, each insulator 20, 30 includes a plurality of pin-type anchoring protrusions 70 (also referred to as anchoring pips), e.g., nine protrusions, that are adapted to engage within corresponding holes 46 provided in each side of the nine stator teeth 42 of the stator core 40. In the illustrated embodiment, a protrusion 70 is provided at the end of each petal 62 near an internal diameter of each insulator 20, 30. However, more or less protrusions/holes may be provided, and in different locations. This arrangement self-adheres and aligns the insulators 20, 30 to the stator core 40.

Figure 1:
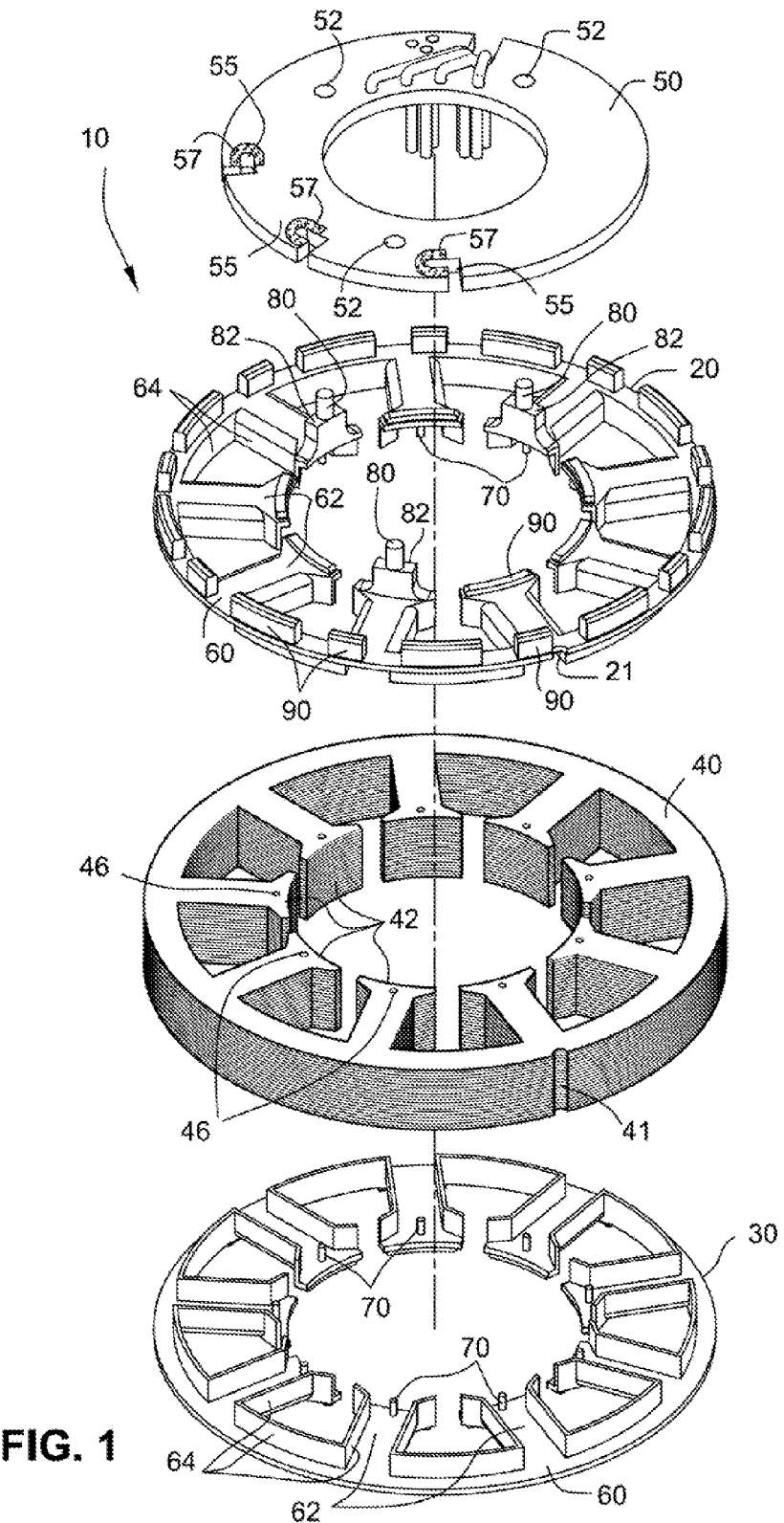
FIG. 1 is an exploded view of a stator assembly including first and second insulators according to an embodiment of the present invention.

As shown in FIG. 1, the stator core 40 may include a notch 41 that may be adapted to align with a notch 21 provided on one or both of the insulators 20, 30. Thus, the notches 21, 41 may act as reference points to properly position and align the insulators 20, 30 with respect to the stator core 40 during assembly.

FIGS. 3-9 illustrate the first and second insulators 20, 30 mounted to respective sides of the stator core 40. As illustrated, the main wall 60 (FIG. 5) and side walls 64 of the first insulator 20 cover top and side portions of, the stator core 40, and the main wall 60 and side walls 64 of the second insulator 30 cover bottom and side portions of the stator core 40. Thus, the first and second insulators 20, 30 cooperate to at least partially surround and insulate the stator core 40 from the stator coils 44.

As illustrated, a small gap or spacing 65 is provided between the first and second insulators 20, 30. The gap 65 is sufficiently large to allow for manufacturing tolerances and sufficiently small to ensure that the magnetic wiring cannot slump into the gap and directly touch the stator laminations, thus ensuring the double insulation properties that are desired. Without some spacing between the first and second insulators 20, 30, normal manufacturing tolerances may allow interference or contact at the central plane where the first and second insulators meet. Contact between the first and second insulators 20, 30 may cause one or both of the insulators to "bow" at the stack face, which would be undesirable due to the associated loss of dimensional control.

Figure 3:
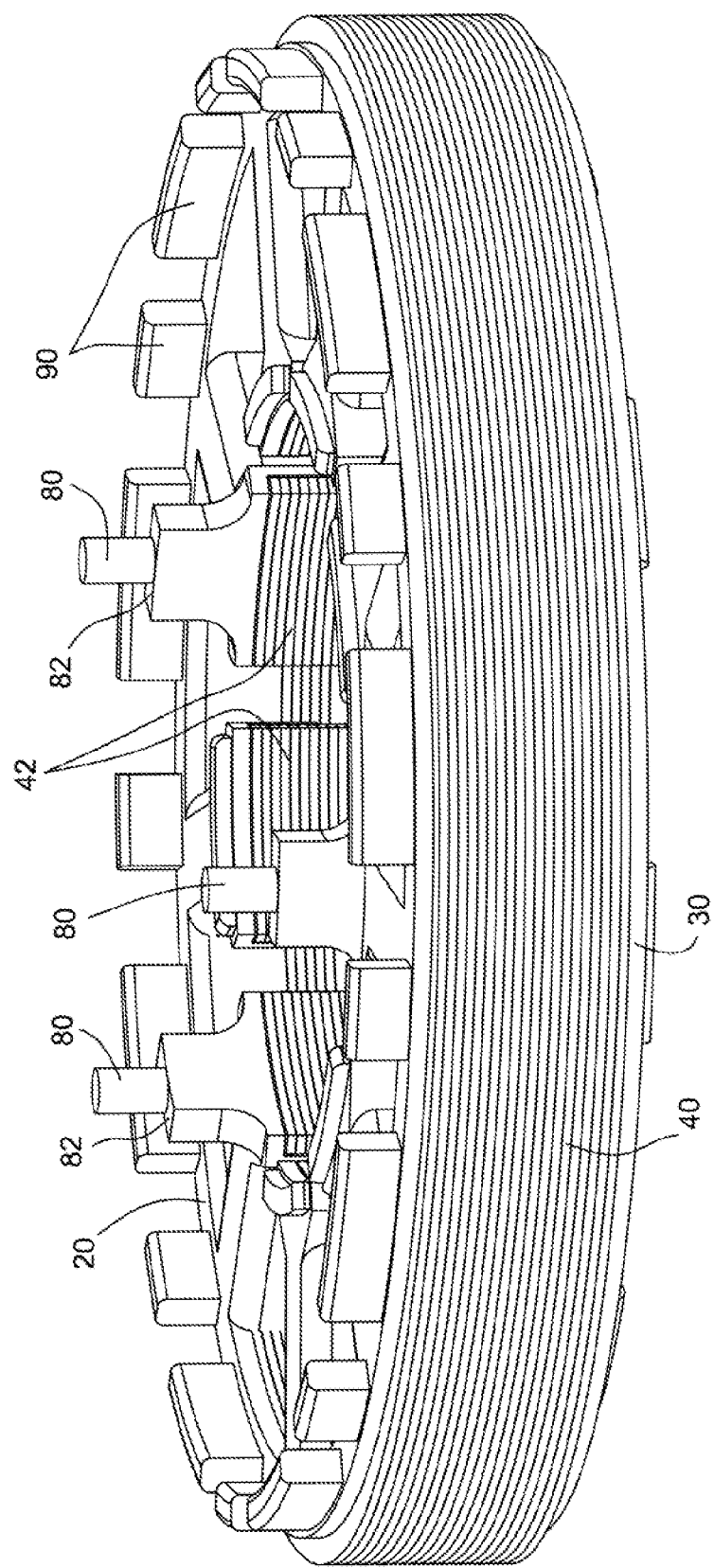
FIG. 3 is a perspective view of the first and second insulators shown in FIG. 1 assembled to a stator core according to an embodiment of the present invention.
Figure 8:
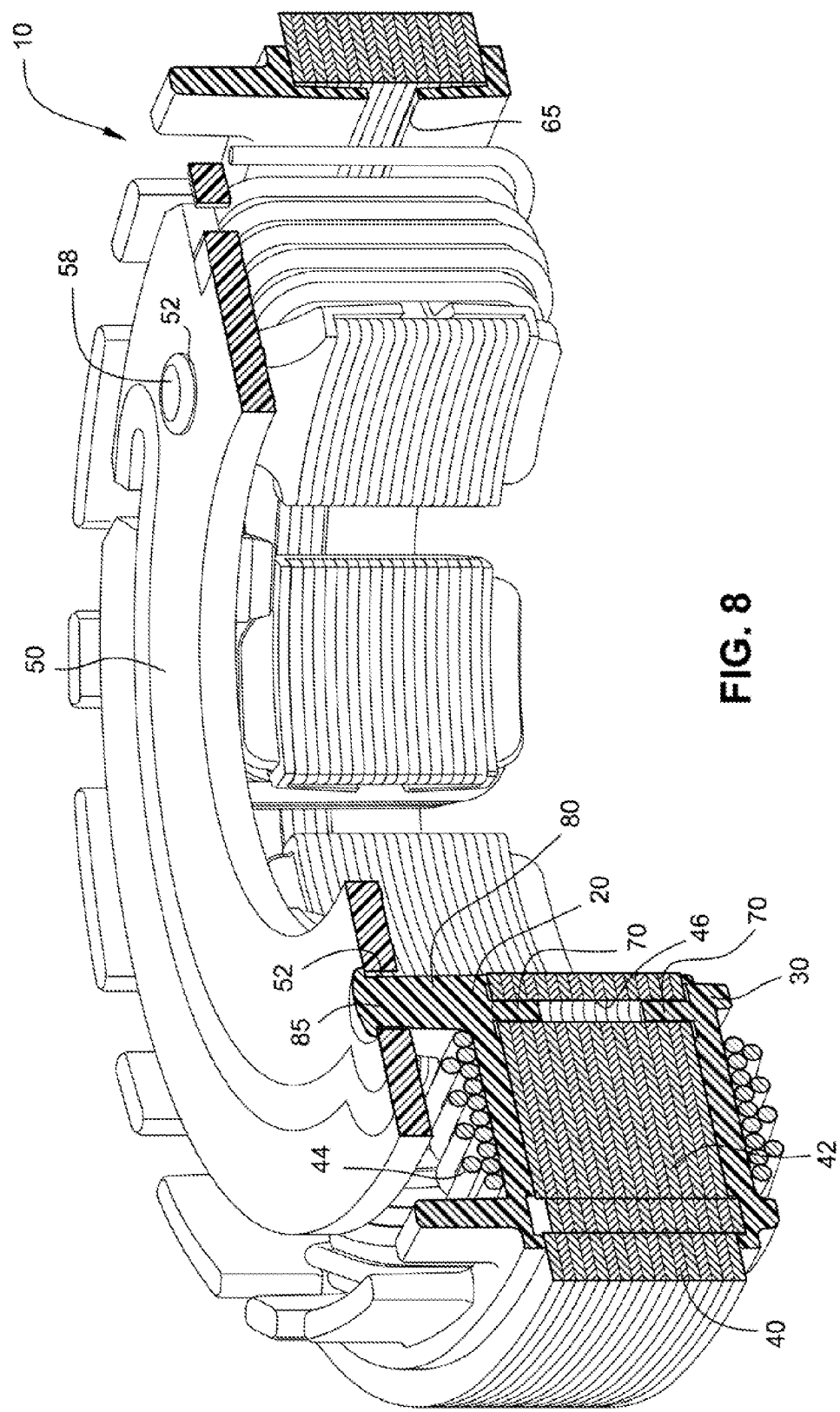
FIGS. 8 and 9 are cross-sectional views illustrating an assembly including a stator core, first and second insulators, stator coils, and PCBA according to an embodiment of the present invention.
Figure 9:
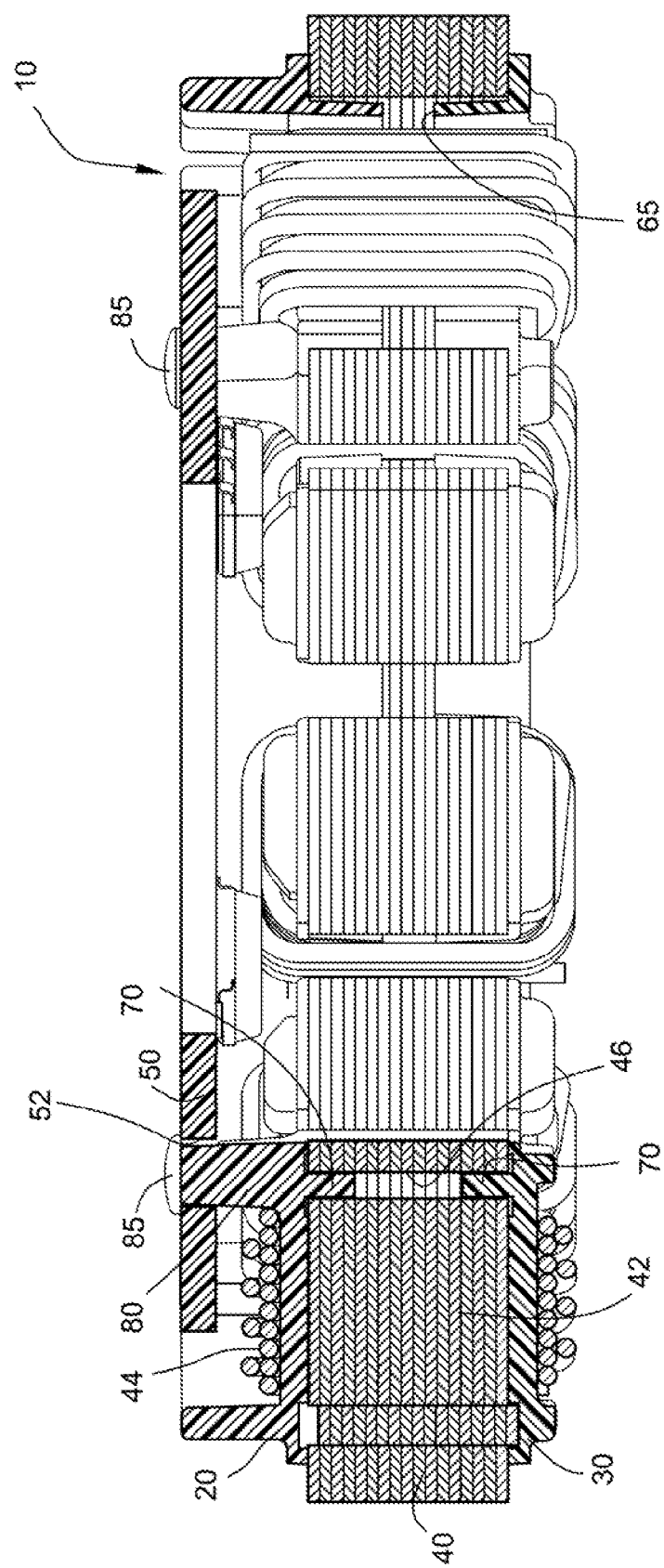

FIG. 3 illustrates first and second insulators 20, 30 provided to the stator core 40 before stator coils are wound, FIGS. 4-7 illustrate the assembly of the stator core 40, insulators 20, 30, and stator coils 44, and FIGS. 8-9 illustrate the assembly of the stator core 40, insulators 20, 30, stator coils 44, and PCBA 50.

Figures 1, 10:
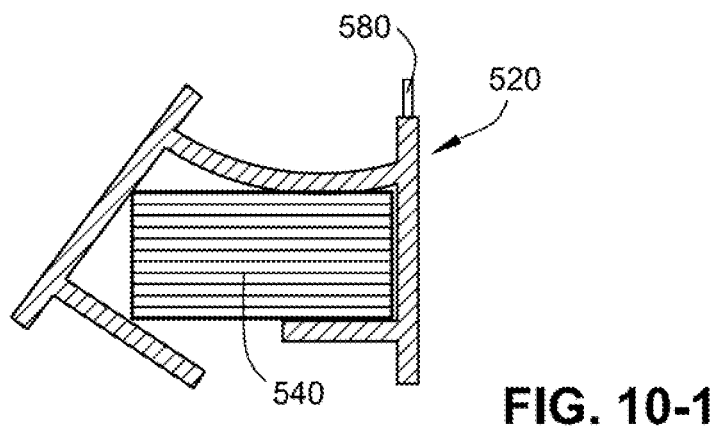
FIG. 10 is a cross-sectional view illustrating an insulator provided to a stator core and stator coils according to another embodiment of the present invention.
Figures 2, 10:
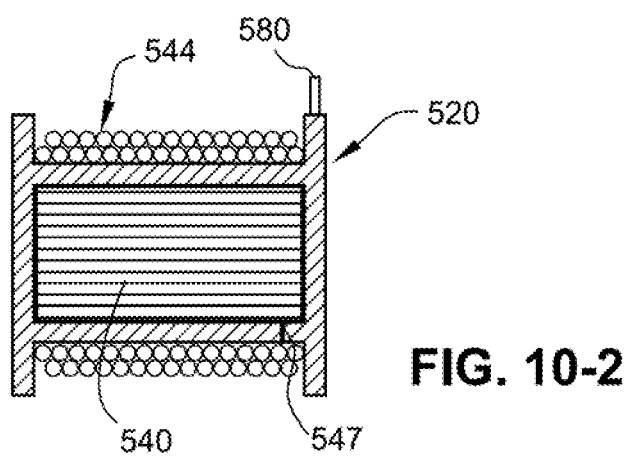
Figures 3, 10:
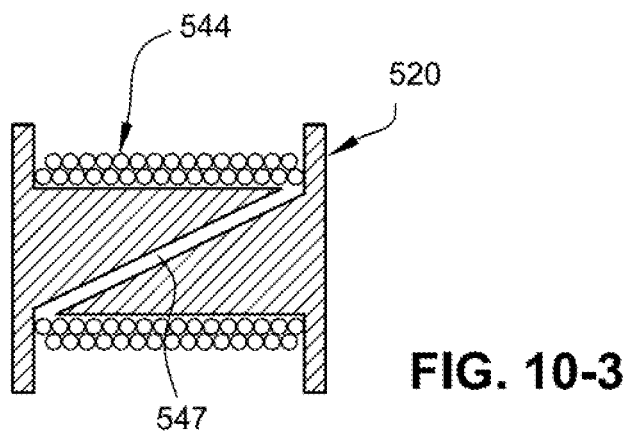

In an alternative embodiment, the stator assembly may include only a single insulator rather than two separate insulators. For example, as shown in FIG. 10, an insulator 220 may be injection molded (e.g., overmolded) onto the stator core 40. As illustrated, the insulator 220 incorporates the first and second insulators as a one-piece integral insulator with no spacing therebetween.

Figure 2:
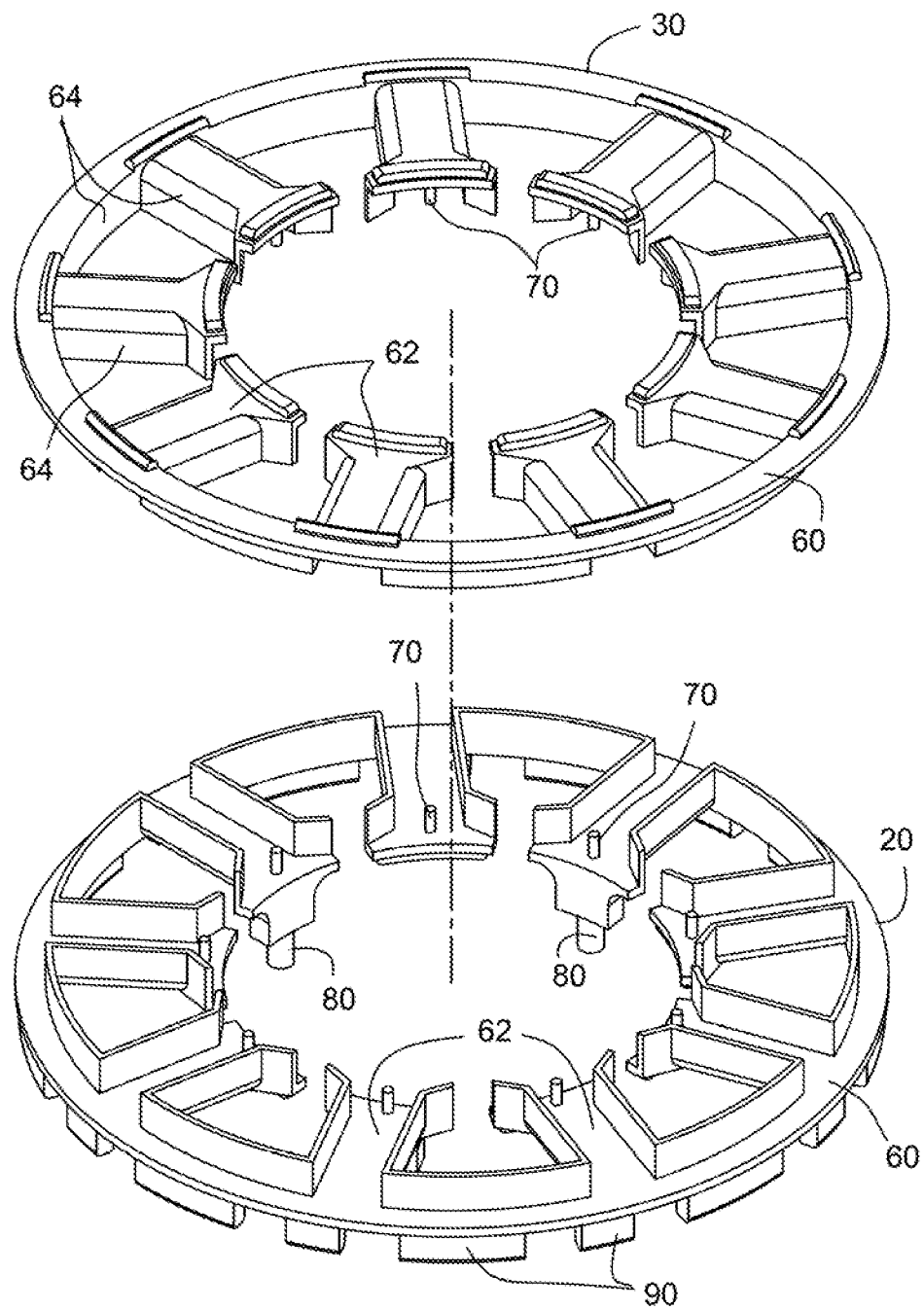
FIG. 2 is a perspective view of the first and second insulators shown in FIG. 1 according to an embodiment of the present invention.

In another example, as shown in FIGS. 10-1 to 10-3, the insulator may be separately molded as a one-piece structure and assembled to the stator core. As illustrated, the one-piece insulator 520 is structured to wrap around the stator core 540 to insulate the stator core 540 from magnetic wiring 544. In the illustrated embodiment, a lower wall of the insulator 520 includes a split configuration that allows one side of the insulator 520 to engage one side of the stator core 540 as the opposite side of the insulator 520 is resiliently flexed and engaged with the opposite side of the stator core 540 (see FIG. 10-1). As shown in FIGS. 10-2 and 10-3, the split 547 along the lower wall is provided at an angle so that the magnetic wiring 544 cannot engage the stator core 540. Also, the insulator 520 may provide one or more protrusions 580 for supporting a PCBA as discussed in further detail below.

In yet another alternative embodiment, one of the first and second insulators (or the insulator if only one component) may be integrally molded with the PCBA 50.

1.2 PCBA Mounting and Positioning

As shown in FIGS. 1 and 3-7, the first insulator 20 also includes a plurality of pin-type mounting protrusions 80 (also referred to as pips) that are adapted to engage within corresponding holes 52 provided in the PCBA 50. As illustrated, the protrusions 80 are provided on a side of the first insulator 20 that is opposite the side including the protrusions 70 for engaging the stator teeth 42. In the illustrated embodiment, three protrusions 80 are provided that engage within three corresponding holes 52 provided in the PCBA 50. However, more or less protrusions/holes may be provided. In an embodiment, the mounting protrusions 80 may be unevenly spaced so as to allow only one possible mounting position of the PCBA 50 onto them, rendering the assembly "mistake-proof." That is, uneven spacing ensures "mistake-proofing" the assembly of the PCBA 50 to the mounting protrusions 80.

During manufacturing, the PCBA 50 will be positioned onto the first insulator 20 so that the three holes 52 receive the three protrusions 80 therethrough. As illustrated, the protrusions 80 are provided on post members that provide shoulders 82 for supporting the PCBA 50. Then, the arrangement is processed to form heads 85 on the tips of the protrusions 80, e.g., using a horn vibrating at ultrasonic frequency or heat staking, as shown in FIGS. 8 and 9. This forms the protrusions 80 into plastic rivets in order to securely mount the PCBA 50 to the first insulator 20. In addition, the protrusions 80 and holes 52 are positioned to precisely position and align the PCBA 50 and its attendant components accurately with respect to the stator coils 44.

During manufacturing, all the parts fit together with close tolerances. Specifically, the stacked laminations or laminations of the stator core 40 are precisely punched and stacked. The first and second insulators 20, 30 are precisely molded, including the protrusions 80 that hold the PCBA 50. The PCBA 50 is precisely drilled. The Hall sensor locations are precisely printed. The Hall sensors are precisely positioned. The insulators 20, 30 and stator teeth 42 position the coils 44. Thus, when the parts are all assembled together, misalignment is controlled and does not need to be verified by inspection.

1.3 Magnetic Wiring Guidance

The insulators 20, 30 also help to guide the magnetic wiring of the stator coils 44 during stator coil winding. Specifically, the stator coils 44 are wound on the stator teeth 42 after the insulators 20, 30 are mounted to the stator core 40. The walls 60, 62, 64 of the insulators 20, 30 are contoured and arranged to facilitate the coil winding around the stator teeth 42. In addition, one or more guide walls or ridges 90 are provided to the outer periphery of at least one of the insulators 20, 30 to guide the "crossovers" that form the connection between stator coils. For example, magnetic wiring may be wrapped around interior and/or exterior surfaces of the guide walls as it passes from one coil to the next associated coil. Further details of a guide wall embodiment are described in greater detail below.

The insulator geometry may be helpful for shaping the individual stator coils, in that the bending radii at the corners of the stator teeth are controlled to control bending radii, at least in part, by the radii of the insulator petals 62. The PCBA 50 also includes a "plate-through" feature to help guide wiring and provide a convenient interface where the end of wiring can be soldered to the PCBA. Specifically, as shown in FIG. 1, the PCBA 50 includes one or more slots 55, e.g., three slots for a three phase motor, at the edge thereof. In the illustrated embodiment, each slot 55 is L-shaped. However, the slots 55 may have other suitable shapes, e.g., straight slot. Each slot 55 provides a self-locating feature for guiding magnetic wiring connected to the PCBA 50.

In an embodiment, a soldering surface 57 (e.g., gold surface) may be provided around each L-shaped slot 55 to facilitate connection of wire to the PCBA 50.

2.0 Motor Incorporated into Flow Generator

The insulators 20, 30 may be provided in stator assembly of a motor, e.g., for incorporation into a PAP device or a flow generator structured to generate a supply of pressurized air to be provided to a patient for treatment, e.g., of Sleep Disordered Breathing (SDB) with Non-Invasive Positive Pressure Ventilation (NIPPV).

Figure 12:
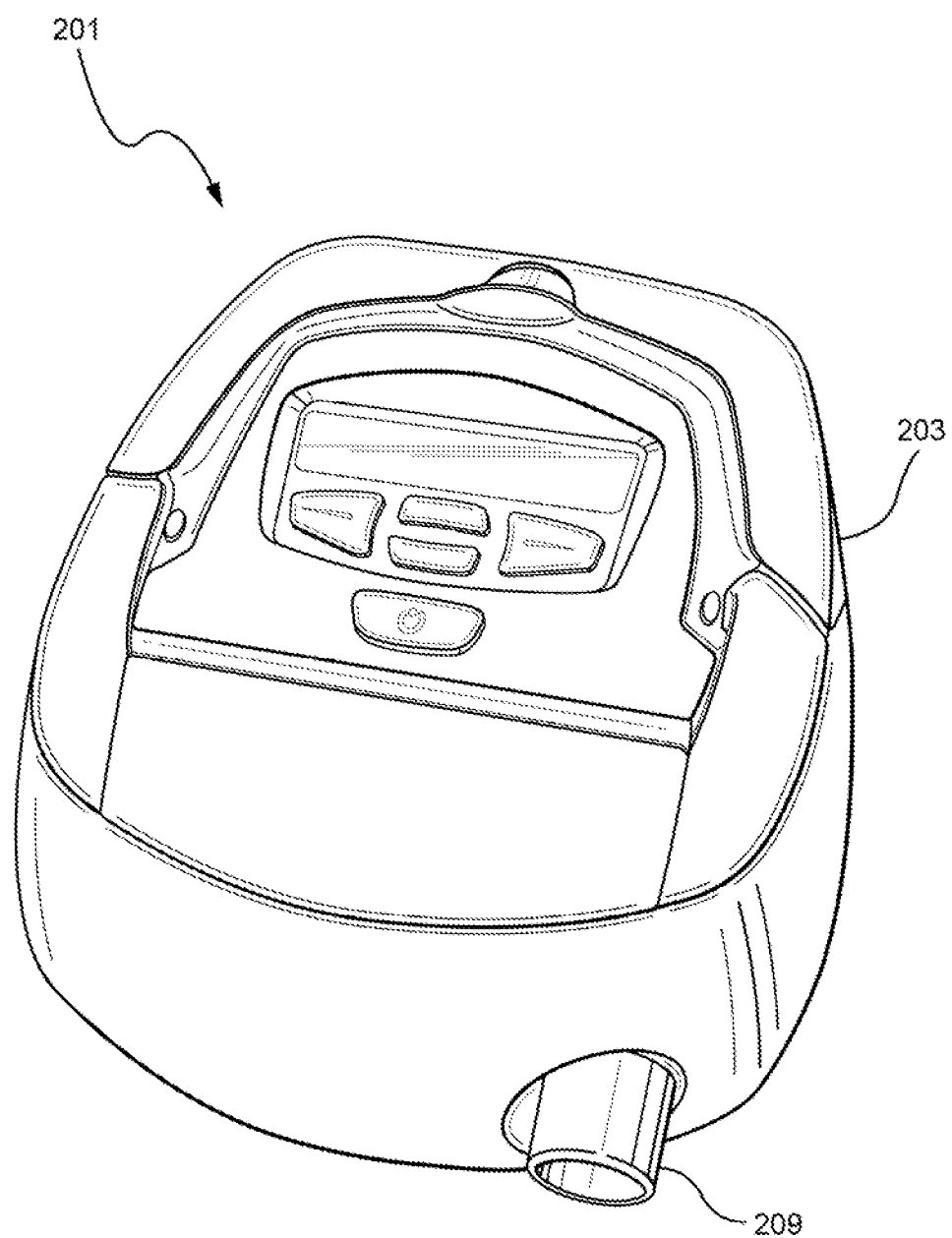
FIG. 12 is a schematic view of an exemplary embodiment of a flow generator.

For example, FIG. 11 is an exploded view of a flow generator motor assembly 200 for use with a flow generator 201 (e.g., see FIG. 12) including a motor 202 with a stator assembly 10 such as that described above. As illustrated, the flow generator motor assembly 200 includes a housing 204 (with removable end wall 205 (or "end cap" or "end bell")) and a blower 206 supported by or within the housing 204. The blower 206 is operable to draw a supply of air into/along the housing 204 through one or more intake openings (not shown, but typically provided at the bottom or side wall of a housing 203 of the flow generator) and provide a pressurized flow of air at an outlet 208. The supply of pressurized air is delivered to the patient via an air delivery conduit that includes one end coupled to the outlet 208 of the flow generator motor assembly 208 and an opposite end coupled to a mask system that comfortably engages the patient's face and provides a seal. Outlet 208 is coupled to an outlet 209 (FIG. 12) on flow generator 201. A muffler may be interposed between outlets 208 and 209. In an embodiment, the blower 206 is constructed to deliver pressurized air suitable for CPAP or NIPPV, e.g., in the range of 4-28 cmH$_2$O, at flow rates of up to 180 L/min (measured at the mask), depending on patient requirements. Also, the blower 206 may be configured to deliver bilevel therapy (relatively higher pressure upon inhalation and relatively lower pressure upon expiration by the patient).

The blower 206 is supported by or within the housing 204, and includes at least one impeller 14 and the motor 202 to drive the at least one impeller 14. In the illustrated embodiment, the blower 206 has a double-ended, impeller blower construction. Specifically, the motor 202 includes a rotor 11 having a shaft 12 with two shaft ends each being coupled to an impeller 14 and stator assembly 10. However, the blower 206 may include a single impeller coupled to the motor 202.

In the illustrated embodiment, the motor assembly 200 is assembled by attaching the PCBA 50 to the insulator 20 provided to the stator core 40. Then, the assembled stator assembly 10 is assembled to the housing 204 with the PCBA 50 facing "down", i.e., inserting PCBA side of the stator assembly 10 into the housing 204 as shown in FIG. 11. The rotor 11 is inserted into the housing 204 and into an operative position within the stator assembly 10. The rotor 11 and insulated stator core can be pre-assembled to form a sub-assembly before being inserted into the housing with the PCBA 50 facing down. Finally, the end wall 205 is assembled to the housing 204 to enclose the motor 202 within the housing 204.

This arrangement allows replacement of the rotor 12 (e.g., for bearing failure) instead of replacing the entire motor 202 (including the insulated stator core which may not be faulty). Specifically, only the end wall 205 needs to be removed in order to remove the rotor 12 for replacement.

The insulators may be incorporated into blower assemblies such as those disclosed in U.S. Pat. No. 6,910,483, U.S. Patent Publication No. 2005/0103339, and U.S. Provisional Patent Applications 60/730,875, entitled "Multiple Stage Blowers and Nested Volutes Thereof" filed Oct. 28, 2005, and 60/775,333, entitled "Blower Motor with Flexible Support Sleeve" filed Feb. 22, 2006, each of which is incorporated herein by reference in its entirety.

3.0 Advantages

Because the first and second insulators 20, 30 are structured to provide up to four functions, they provide several advantages. For example, the insulators 20, may be incorporated into a flow generator motor assembly to provide a smaller, quieter, more responsive, more reliable, and cost-effective flow generator for the patient. In addition, the insulators 20, 30 enable a more compact and less expensive flow generator.

4. Alternative Embodiment of Insulators

FIGS. 13-1 to 13-9 and 14-1 to 14-8 illustrate first and second insulators 320, 330 according to another embodiment of the present invention. As illustrated, each insulator 320, 330 includes a main wall 360 that provides a plurality of teeth or petals 362. Side walls 364 extend from the main wall 360 along the slots that separate the petals 362, and side walls 365 extend from sides of each petal 362. The arrangement insulates the magnetic wiring from the stator core and ensures that there is no direct contact between the magnetic wiring and the stator core. Also, the walls 364, 365 stiffen the insulators 320, 330 and conform the insulators 320, 330 to the stator teeth of the stator core.

4.1 Anchoring Protrusions

Each insulator 320, 330 includes a plurality of pin-type anchoring protrusions 370 that are adapted to engage within corresponding holes provided in each side of the stator teeth of the stator core. In the illustrated embodiment, a protrusion 370 is provided at the end of each petal 362 near an internal diameter of each insulator 320, 330. The protrusions 370 are structured to hold and align the insulators 320, 330 to the stator core until coil winding occurs.

4.1.1 Protrusion Shape

Figure 4:
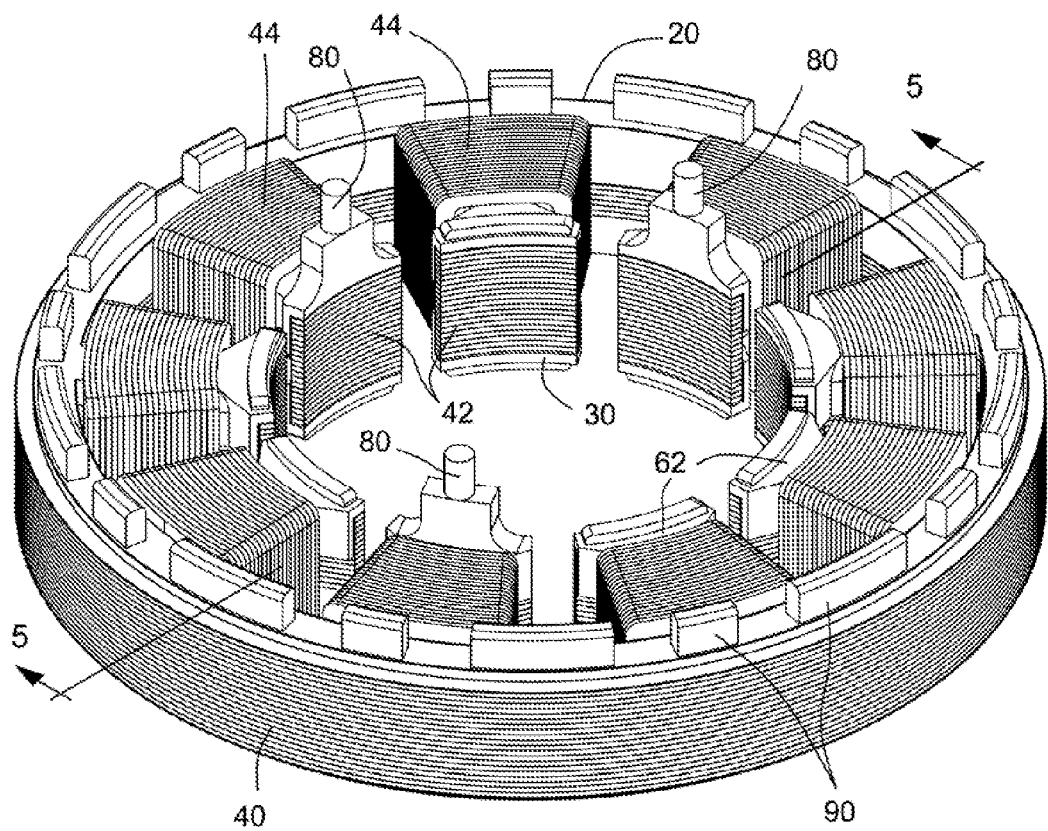
FIG. 4 is a perspective view of the assembly shown in FIG. 3 with stator coils wound around the stator teeth according to an embodiment of the present invention.
Figures 2, 13:
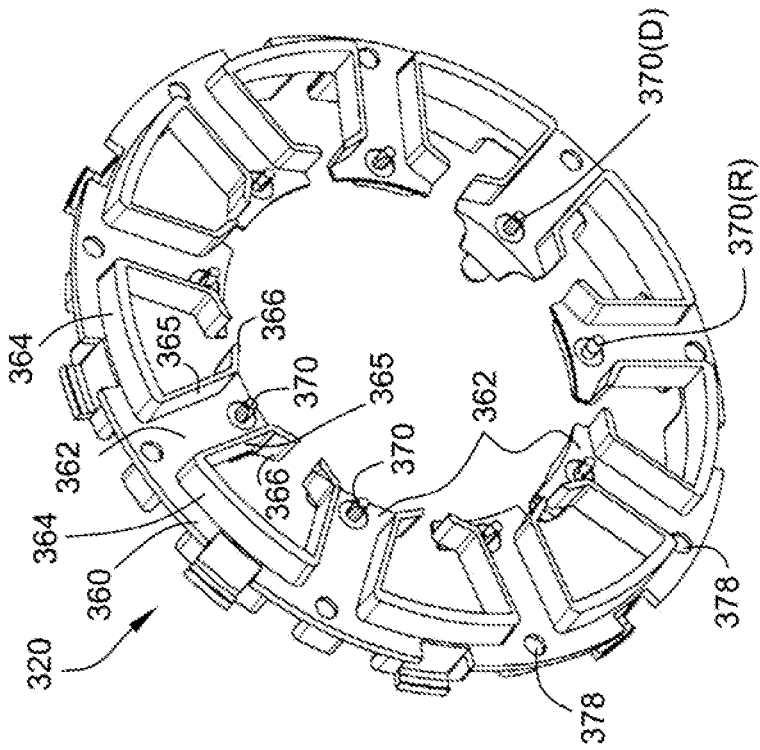
Figures 1, 13:
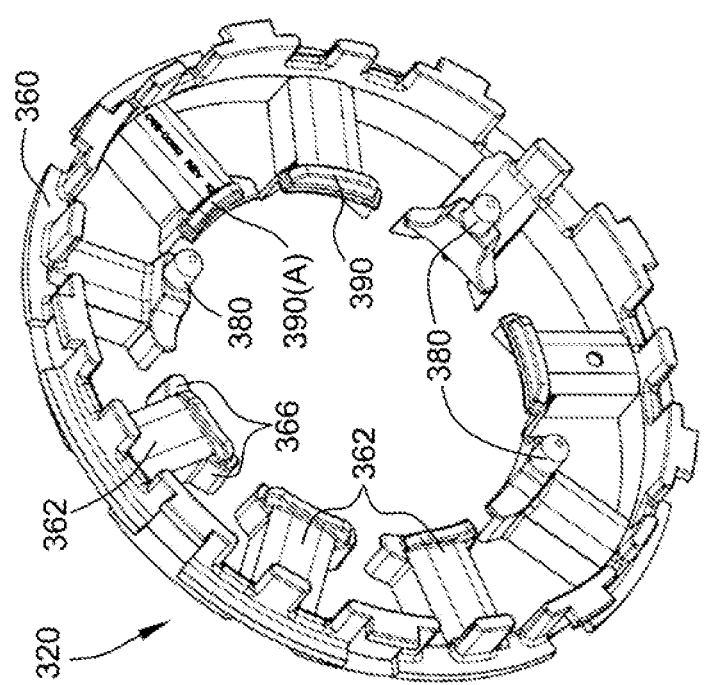
Figures 6, 13:
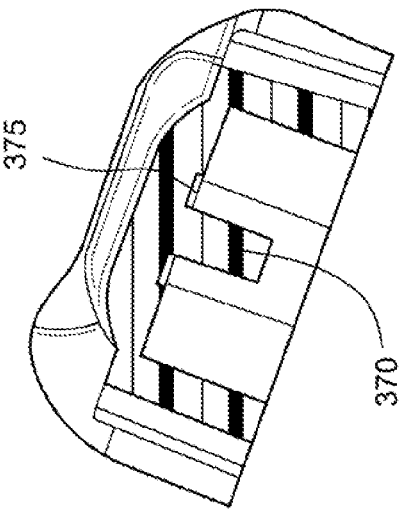
Figures 7, 13:
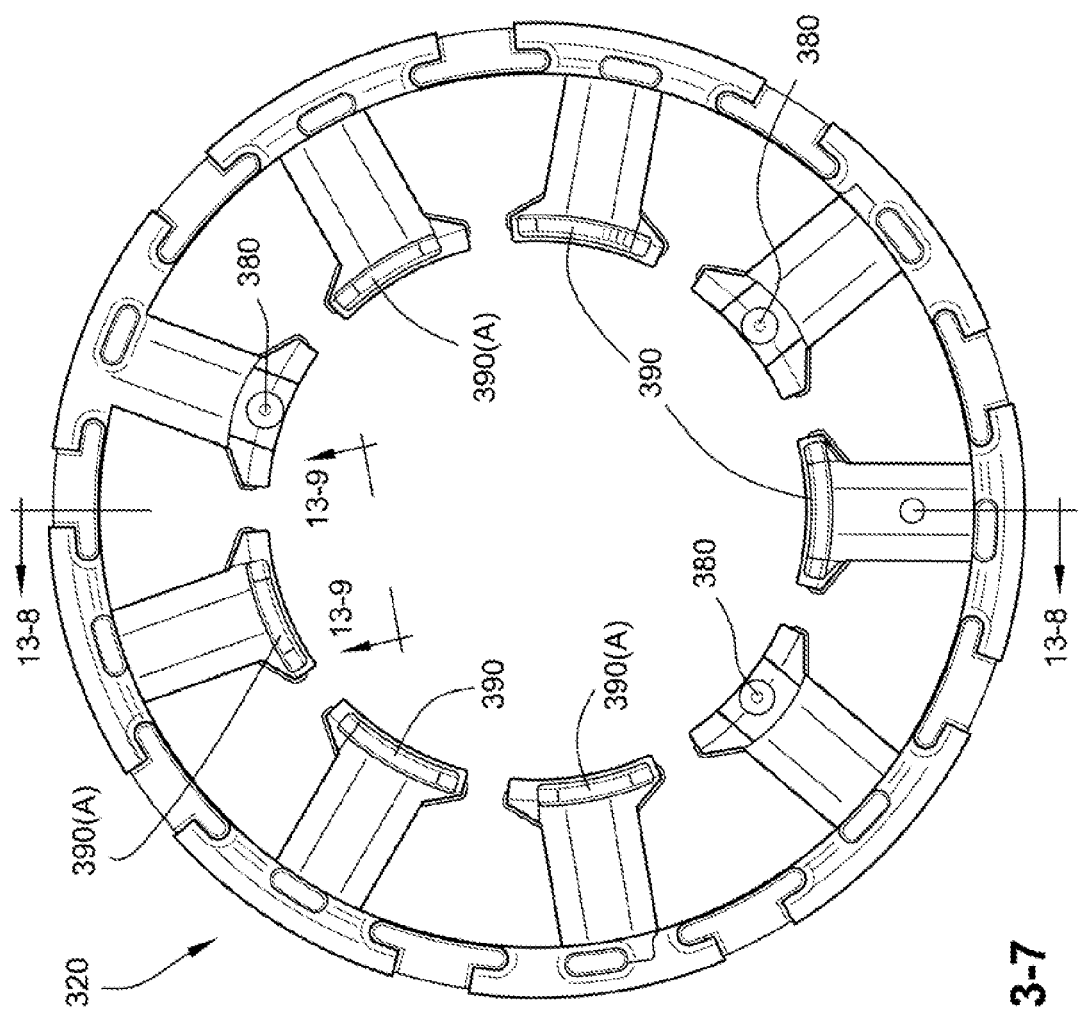
Figures 9, 13:
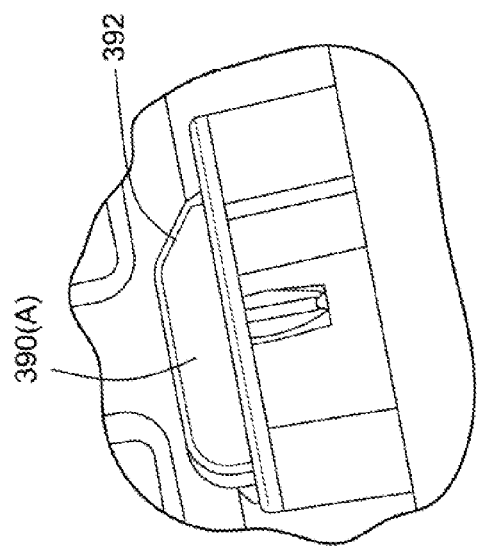
Figures 8, 13:
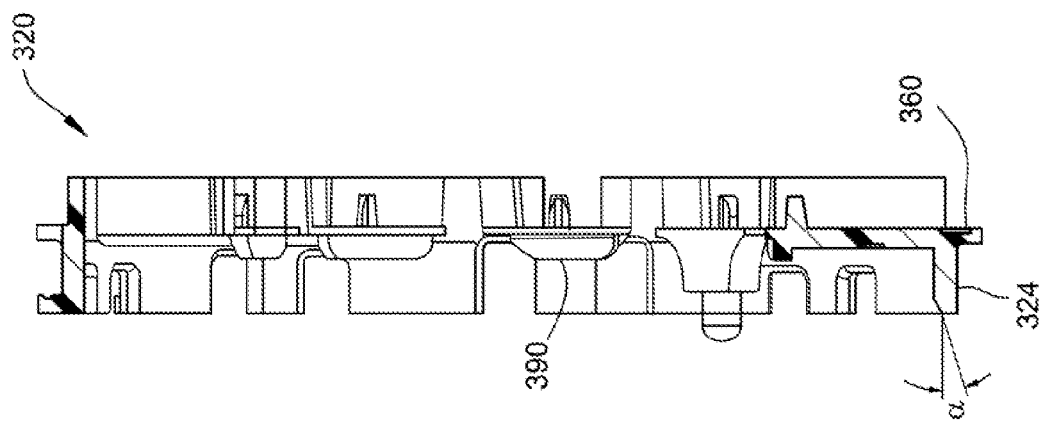
Figures 2, 14:
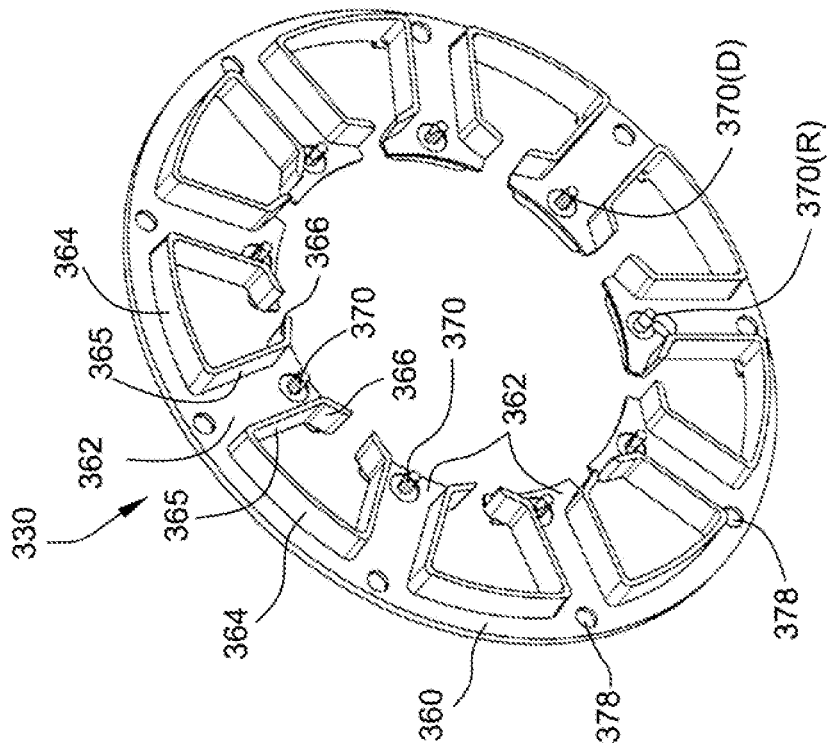
Figures 1, 14:
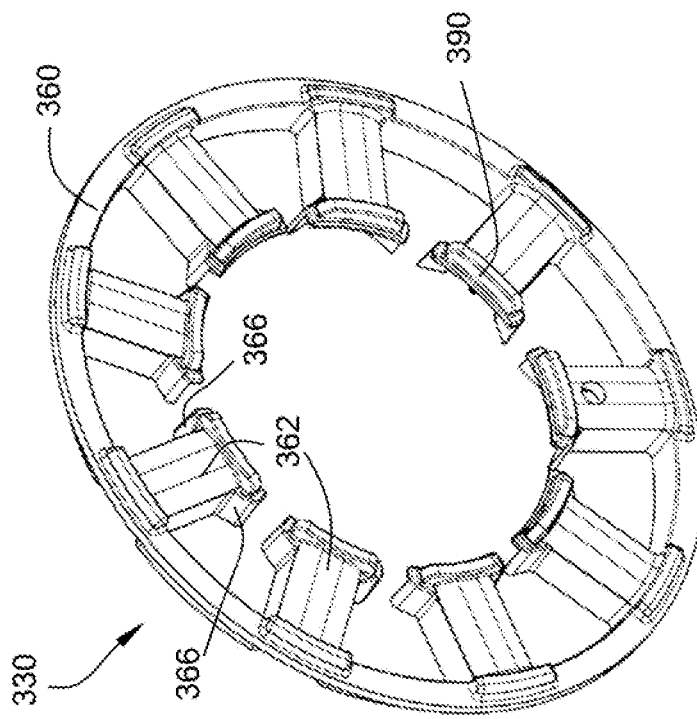
Figures 4, 14:
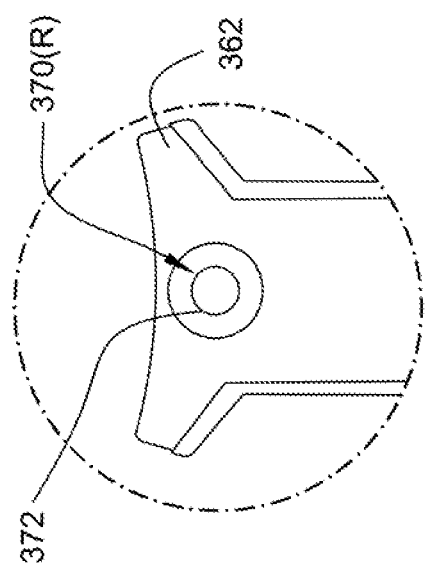
Figures 5, 14:
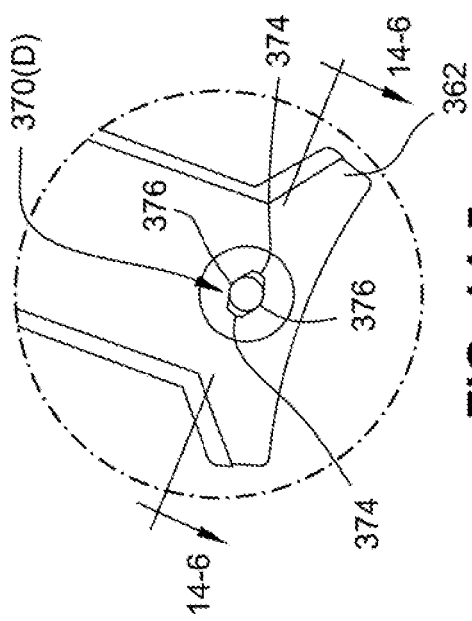
Figures 6, 14:
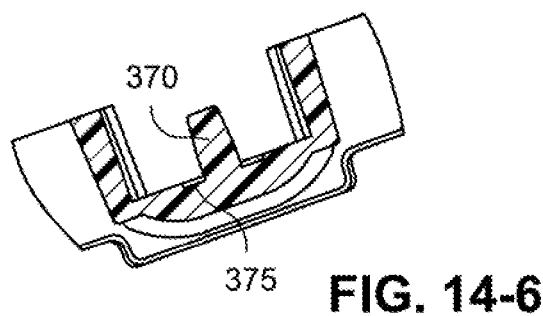
Figures 7, 14:
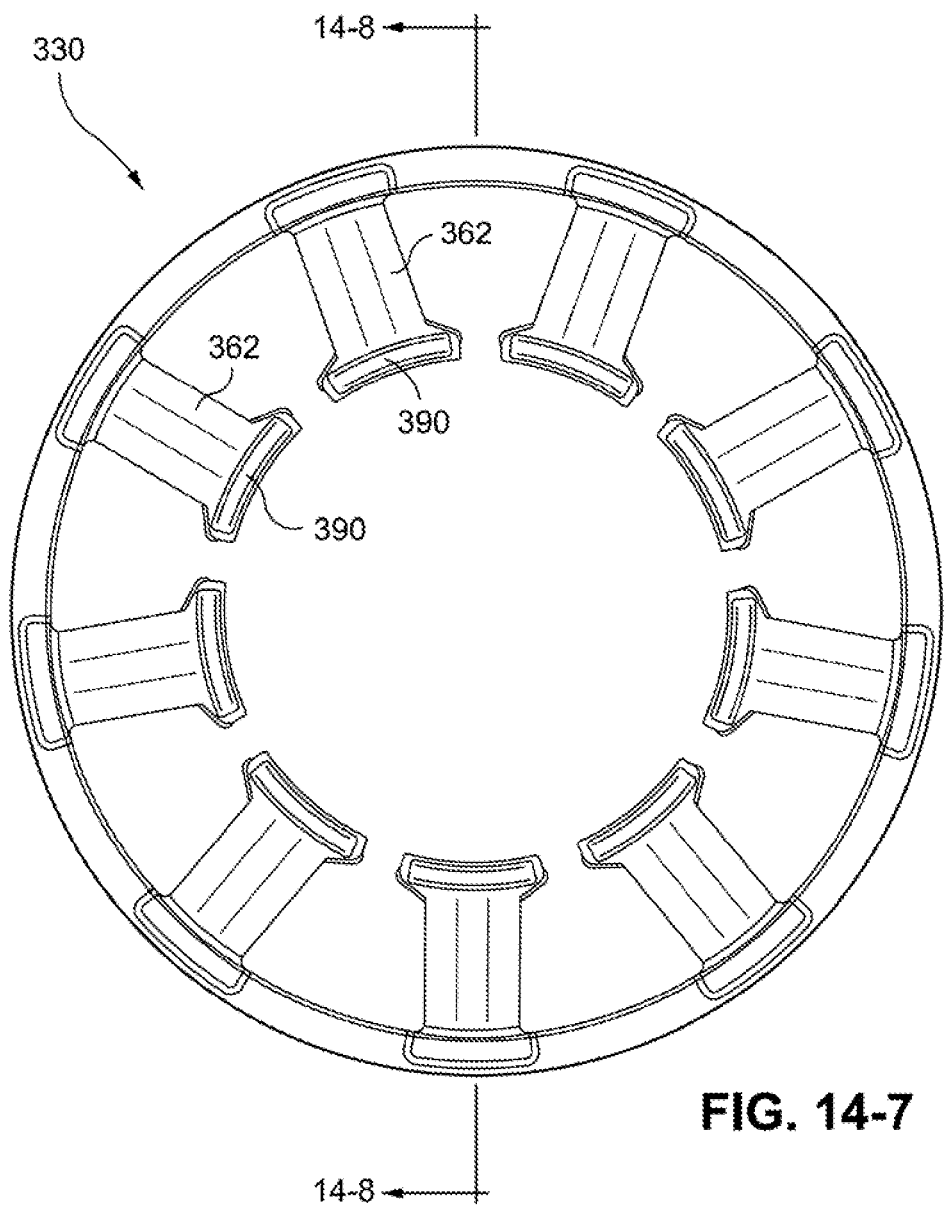
Figures 8, 14:
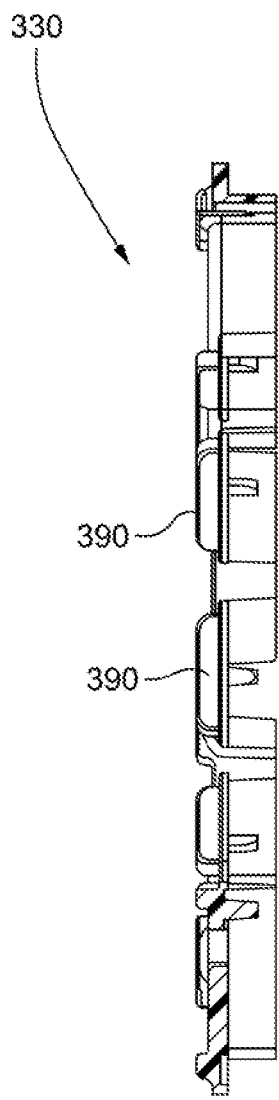

In the illustrated embodiment, each insulator 320, 330 includes one anchoring protrusion 370 having a circular or round shape while the remainder of the anchoring protrusions 370 have a diamond shape. For example, FIGS. 13-2 and 13-3 illustrate insulator 320 with one petal 362 including a round-shaped anchoring protrusion 370(R) and the remaining petals 362 including a diamond-shaped protrusion 370(D). FIGS. 14-2 and 14-3 illustrate insulator 330 with one petal 362 including a round-shaped protrusion 370(R) and the remaining petals 362 including a diamond-shaped protrusion 370(D). As best shown in FIGS. 13-4 and 14-4, the round-shaped protrusion 370(R) of each insulator 320, 330 includes a circular or round exterior surface 372. As best shown in FIGS. 13-5 and 14-5, the diamond-shaped protrusion 370(D) of each insulator 320, 330 includes opposing part-circular surfaces 374 (having a similar radius of curvature as the round surface 372) joined by surfaces 376.

This arrangement removes redundancy to provide a reference point to properly position and align the insulators 320, 330 with respect to the stator core during assembly. Moreover, this arrangement provides precise alignment without the need for high manufacturing tolerances. For example, the round-shaped protrusion 370(R) may be manufactured with higher tolerances to precisely align each insulator 320, 330 along x and y axes, and the remaining diamond-shaped protrusions 370(D) may be manufactured with lower tolerances.

4.1.2 Reservoir Around Protrusion

Figure 6:
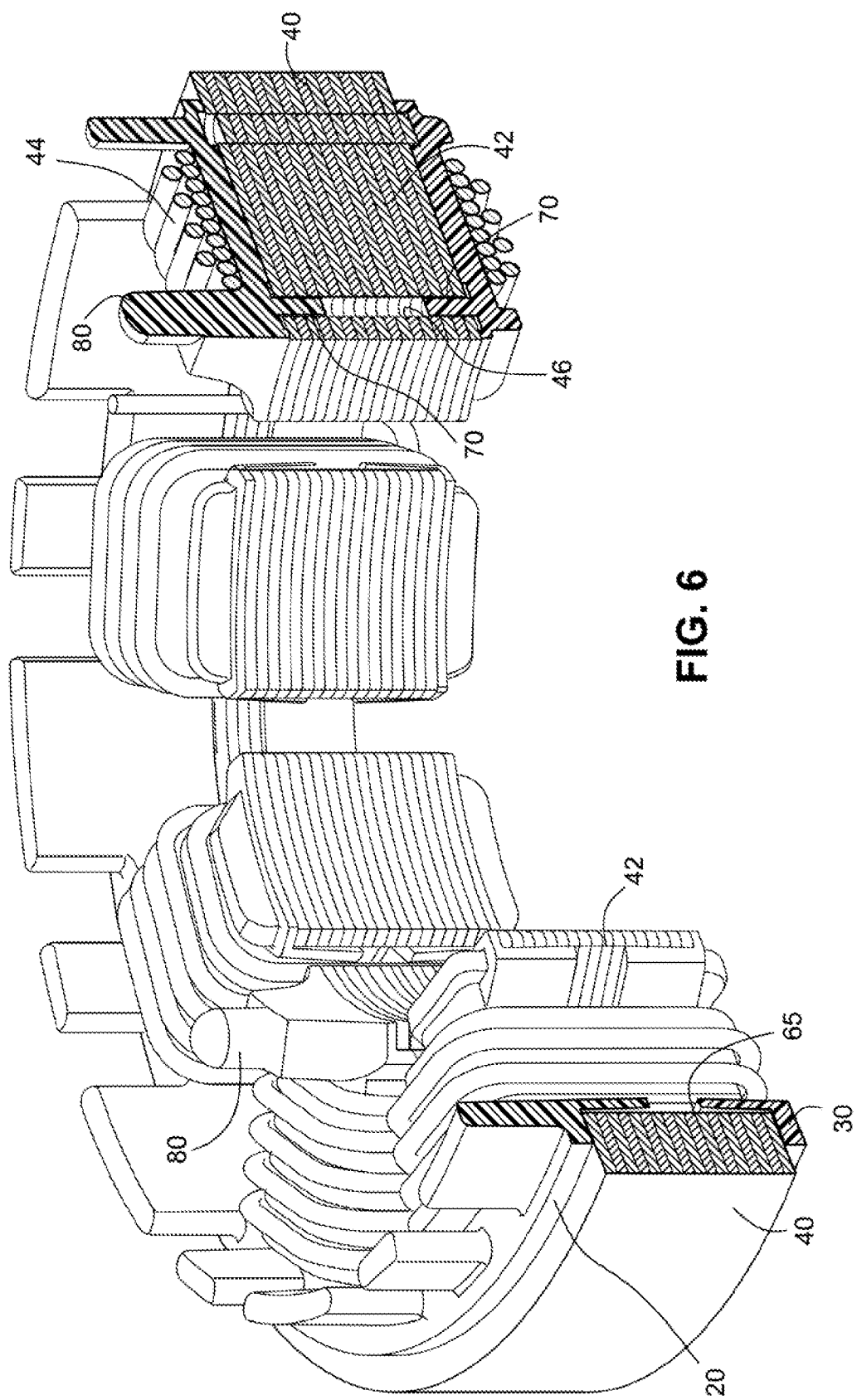
FIGS. 6 and 7 are alternative cross-sectional views through the assembly shown in FIG. 4.
Figure 7:
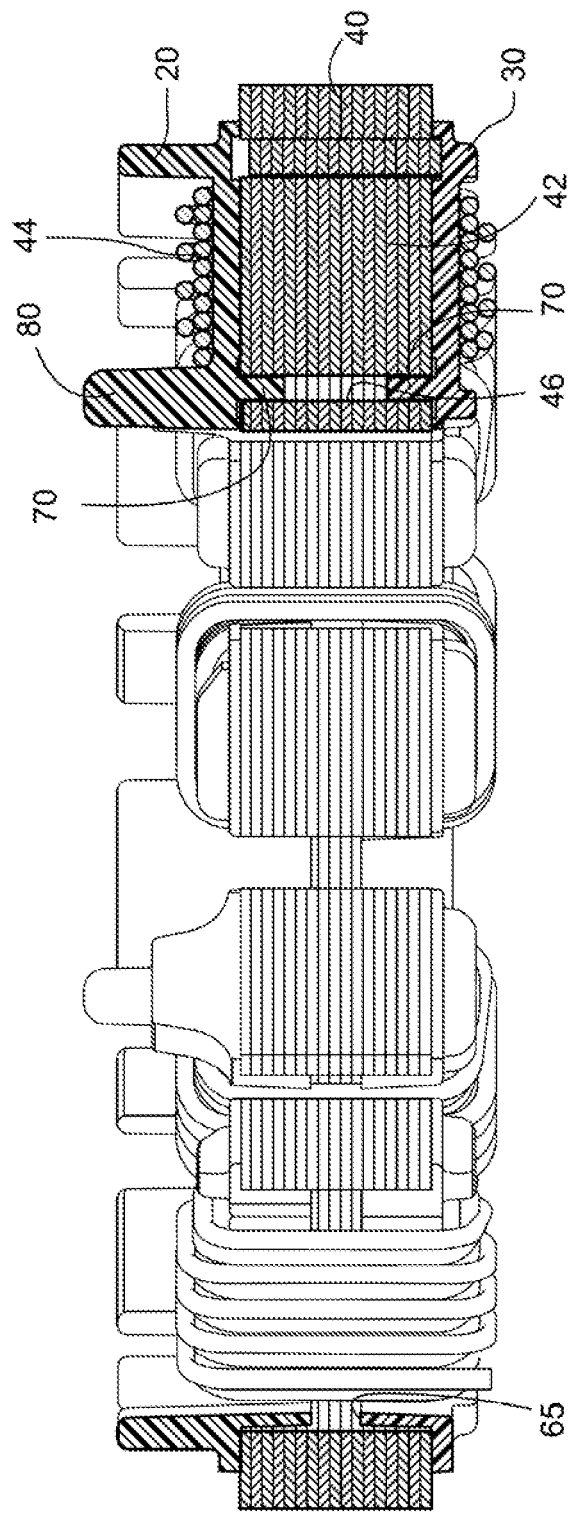

As best shown in FIGS. 13-6 and 14-6, a reservoir 375, e.g., annular reservoir, surrounds each protrusion 370 of the insulators 320, 330. Such reservoir 375 is adapted to hold or receive any excess material that is "scraped" from the protrusion 370 as the protrusion 370 is inserted into the corresponding hole provided in the stator tooth. This arrangement allows the petals 362 and surrounding structures to maintain flush engagement with respective stator teeth.

4.2 Depression on Outer Rim

As best shown in FIGS. 13-2 to 13-3 and 14-2 to 143, each insulator 320, 330 includes a plurality of depressions 378, e.g., circular-shaped recesses, along the outer rim of the main wall 360. As illustrated, each depression 378 is aligned with a respective petal 362 near an external diameter of each insulator 320, 330. The depressions 378 are adapted to receive corresponding dimples provided on at least one side of the stator core. Such dimples on the stator core may be formed during manufacturing of the stator core, e.g., during stacking of the laminations of the stator core.

For example, FIG. 15-1 illustrates a stator core 340 with dimples 343 along an upper surface thereof, and FIG. 15-2 illustrates an insulator 320, 330 engaged with the stator core 340 with a depression 378 receiving a respective dimple 343.

4.3 Wire Capturing

As best shown in FIGS. 13-1 to 13-2 and 14-1 to 14-2, each petal 362 of the insulators 320, 330 includes curved flanges 366 that extend from respective side walls 365 thereof. As illustrated, the flanges 366 are provide at the edges of each petal 362 to facilitate wire wrapping around the insulators and ensure that the coil is maintained or captured on the insulators.

In addition, the flanges 366 stiffen the insulators 320, 330 and conform the petals 362 to respective teeth of the stator core.

4.4 Asymmetrical Shape of Saddle

As best shown in FIGS. 13-1, 13-7, 13-8, 14-1, 14-7, and 14-8, the edge of petals 362 include a guide wall 390 to facilitate wire wrapping and ensure that the coil is maintained or captured on the insulators.

In the illustrated embodiment, one or more guide walls 390 of the first insulator 320 (which includes mounting protrusions 380 adapted to support the PCBA) include an asymmetrical shape in order to accommodate respective Hall sensors provided to the PCBA.

For example, as shown in FIGS. 13-1, 13-7 and 13-8, the first insulator 320 includes 3 petals with a symmetrical saddle-shaped guide wall 390, 3 petals with an asymmetrical saddle-shaped guide wall 390(A), and 3 petals that provide mounting protrusions 380. The PCBA is adapted to be mounted to the first insulator 320 such that 3 Hall sensors provided to the PCBA may be accommodated in the space provided by the 3 asymmetrical saddle-shaped guide walls 390(A). As best shown in FIG. 13-9, each asymmetrical guide wall 390(A) is shorter in length than the symmetrical guide wall 390 and includes a sloped end 392 to provide such space for the respective Hall sensor.

It should be appreciated that the PCBA may include any suitable number of Hall sensors (e.g., 1, 2, 3, or more Hall sensors), and the insulator 320 adapted to support the PCBA may include a suitable number of asymmetrical guide walls 390(A) to accommodate such Hall sensors.

4.5 Hall Sensor Alignment

In an embodiment, the mounting protrusions 380 adapted to support the PCBA may be asymmetrically arranged or unevenly spaced so as to allow only one possible mounting position of the PCBA onto them, rendering the assembly "mistake-proof." That is, the uneven spacing of the mounting protrusions 380 is juxtaposed with the location of the Hall sensors on the PCBA such that assembly of the PCBA to the mounting protrusions 380 ensures precise positioning of the Hall sensors. Thus, the Hall sensors' positions are automatically "tuned" to the stator coil positions and do not need to be verified by inspection.

4.6 Wire Guidance

Figures 2, 16:
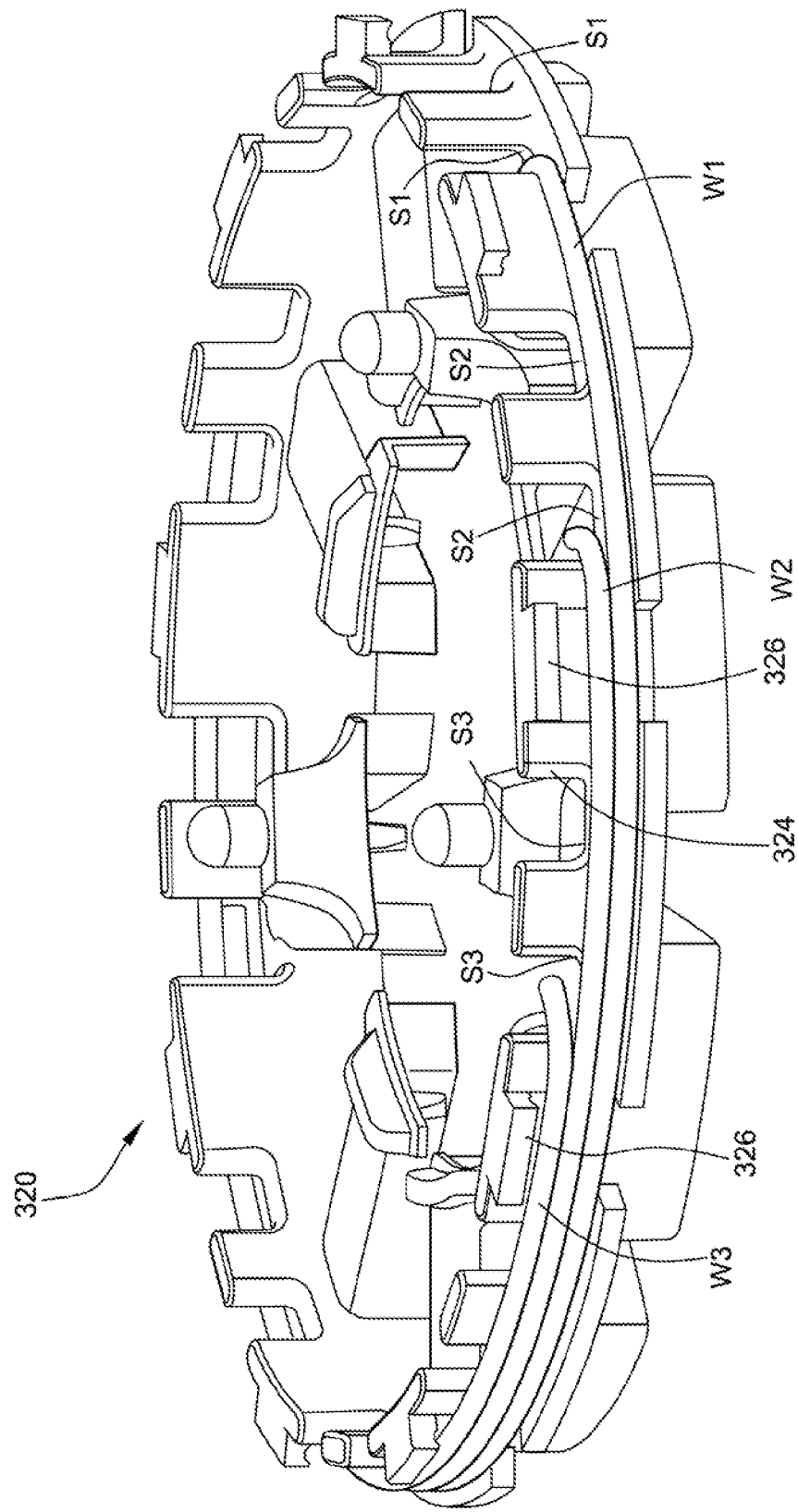
Figures 3, 16:
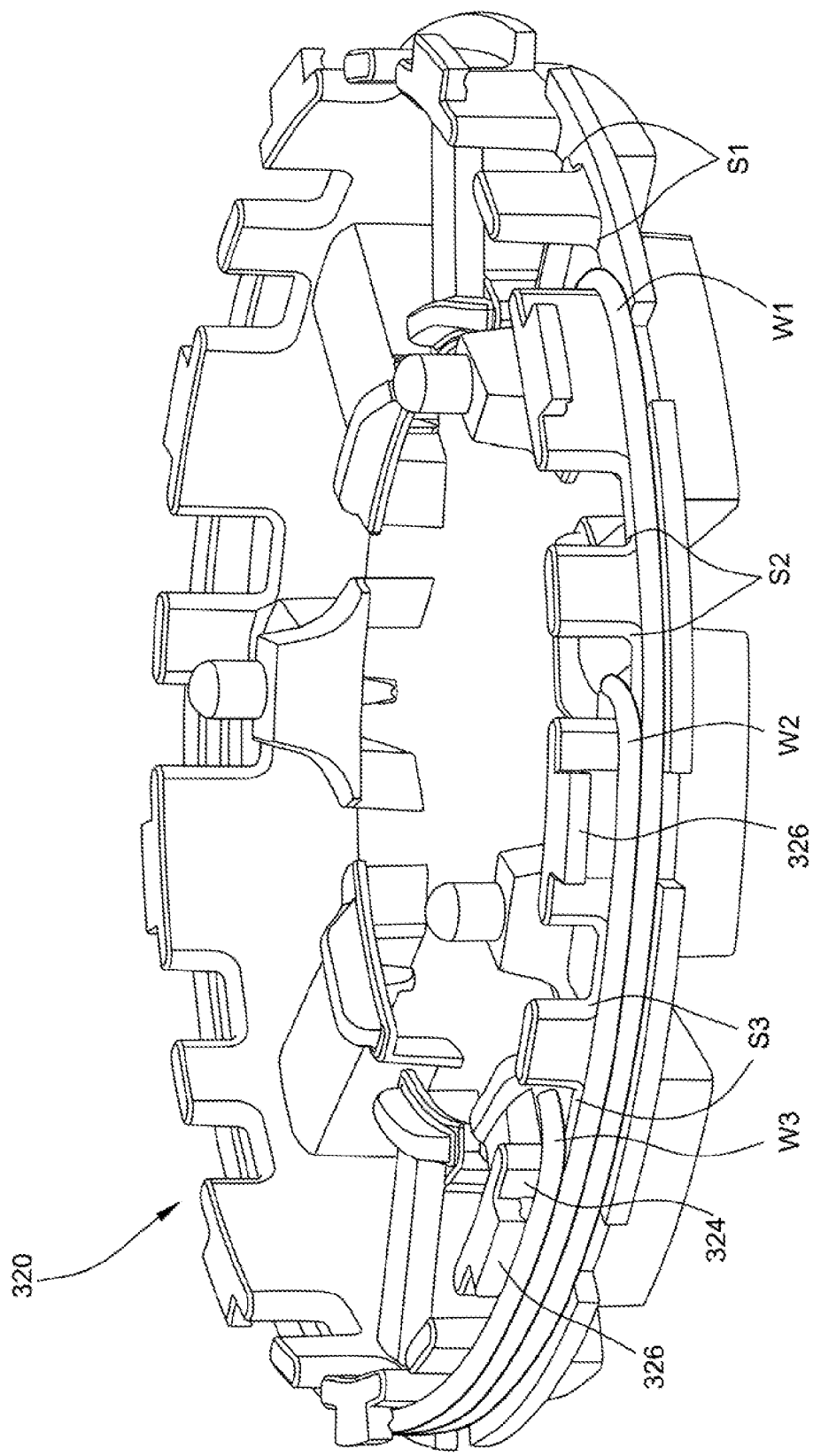
Figures 4, 16:
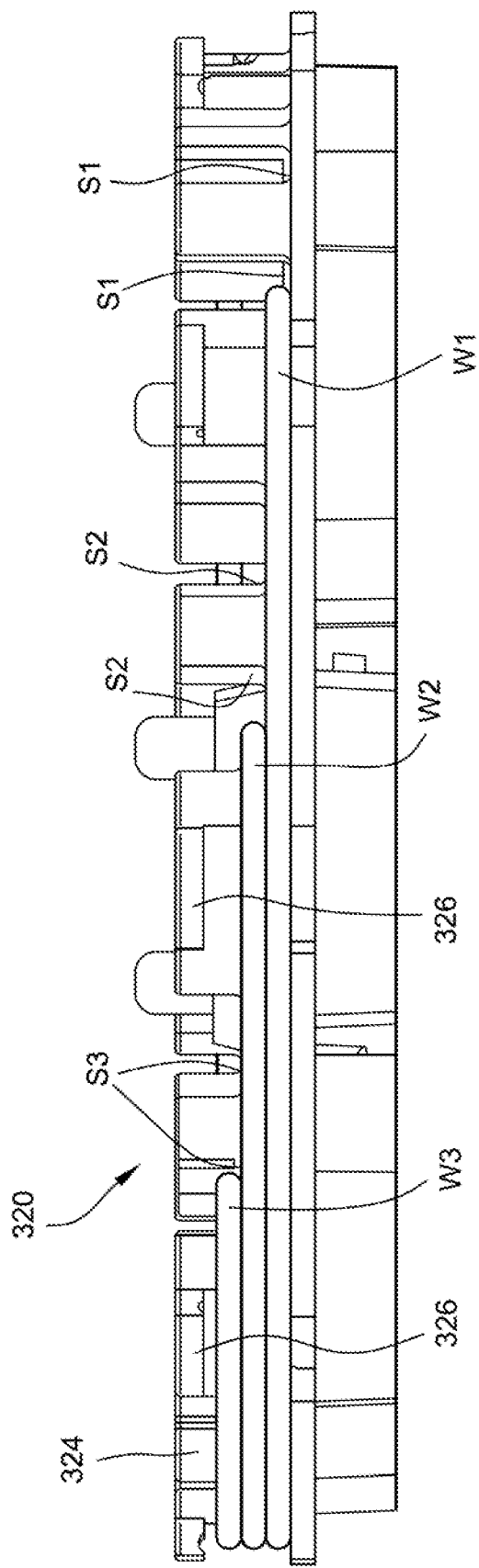
Figures 5, 16:
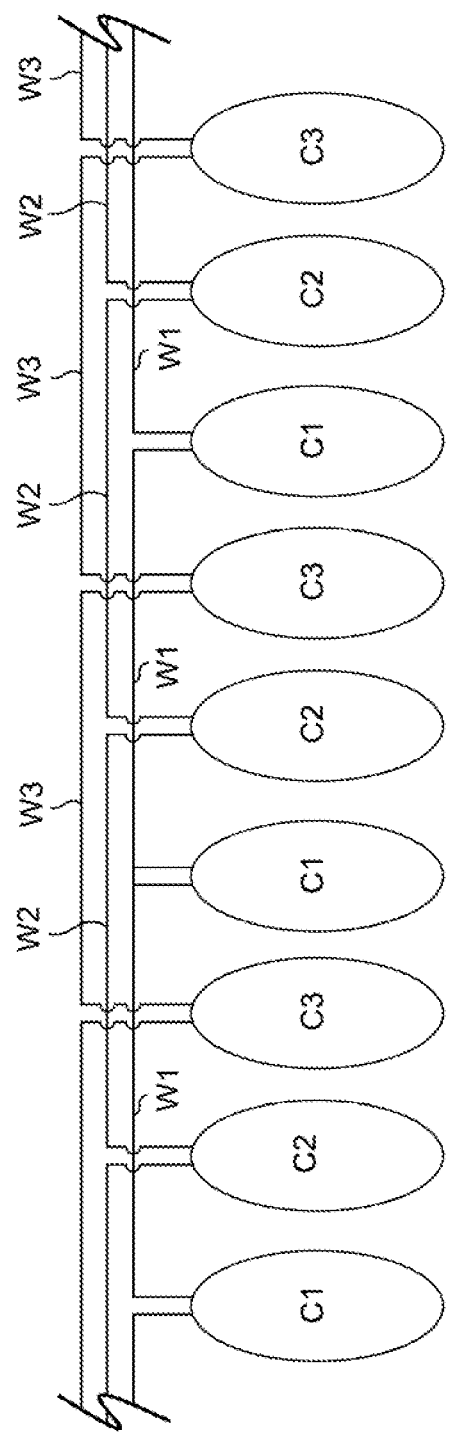

As best shown in FIGS. 16-1 to 16-4, the first insulator 320 includes a guide wall 324 along the outer rim of the main wall 360. The guide wall 324 is structured to guide cross-over wires W1, W2, W3 that form the connection between stator coils.

Referring to the schematic view of FIG. 16-5, the stator assembly includes three sets of stator coils C1, C2, C3 for a three phase motor. Each set includes three stator coils C1, C2, C3 that are connected to one another by respective cross-over wires W1, W2, W3. The stator coils C1, C2, C3 of each set are spaced apart from one another by two stator teeth (or two coils of other sets). Specifically, each set includes a coil that wraps around one stator tooth, a cross-over wire that skips two stator teeth, a second coil that wraps around another stator tooth, another cross-over wire that skips two stator teeth, a third coil that wraps around another stator tooth, and another cross-over wire to connect the coils to the PCBA, and optionally to each other.

As best shown in FIGS. 16-1 to 16-4, the guide wall 324 defines slots adjacent each petal that allow the cross-over wires W1, W2, W3 to wrap around the outer surface of the guide wall 324 and connect respective coils. In addition, the slots are arranged in a stair step manner with different depths to organize the cross-over wires W1, W2, W3 and maintain spacing (e.g., not overlapping) between cross-over wires W1, W2, W3 from different sets of stator coils.

Specifically, the first insulator 320 includes three sets of slots S1, S2, S3 that are associated with a respective one of the three sets of stator coils. Each set of slots includes three pairs of slots S1, S2, S3. Each pair of slots S1, S2, S3 is provided adjacent a respective petal to allow wire to enter on one side of the petal, wrap or coil around the petal and associated stator tooth, and exit on the other side of the petal for crossing over to the next associated coil. Moreover, each set of slots S1, S2, S3 has a depth such that the lower edge of the slot is spaced from the main wall 360 at the same height, and such height is different from the other sets of slots. That is, the first set of slots S1 includes slots wherein the lower edge of each slot S1 is aligned with the upper surface of the main wall 324, the second set of slots S2 includes slots wherein the lower edge of each slot S2 is spaced from the upper surface of the main wall 360 (e.g., by one wire width), and the third set of slots S3 includes slots wherein the lower edge of each slot S3 is spaced from the second set of slots S2 (e.g., by one wire width) and spaced from the first set of slots S1 (e.g., by two wire widths).

As best shown in FIGS. 16-1 to 16-4 that illustrate the "lay" of the cross-over wires W1, W2, W3, the cross-over wires W1, W2, W3 from respective stator sets are guided by respective slots S1, S2, S3 at different heights around the guide wall 324. This arrangement facilitates coil wrapping and controls spacing between cross-over wires W1, W2, W3 as they travel from one coil to the next corresponding coil and presents an orderly appearance.

In an alternative embodiment, the cross-over wires may pass along inner surfaces of the guide wall 324.

4.6.1 Lateral Flange

As best shown in FIGS. 16-1 to 16-4, lateral flanges or hooks 326 are provided at edges of the guide wall 324 of the first insulator 320. The flanges or hooks 326 facilitate wrapping of the cross-over wires W1, W2, W3 around the exterior surface of the guide wall 324 and ensure that the cross-over wires W1, W2, W3 are maintained or captured on the guide wall 324.

4.6.2 Draft Angle

In the illustrated embodiment, the guide wall 324 may be slightly angled from perpendicular with respect to the main wall 360 to facilitate removal of the insulator 320 from a mold. For example, as shown in FIG. 13-8, the angle α may be in the range of about 0.5-5° or 1-3° or about 3.5°, or more.

4.7 Gap Between Insulators

Similar to the insulators 20, 30, the insulators 320, 330 are spaced apart from one another by small gap or space when mounted to respective sides of the stator core (e.g., see gap 65 in FIG. 5). The gap is sufficiently large to allow for lower manufacturing tolerances and sufficiently small to ensure that the magnetic wiring cannot slump into the gap and directly touch the stator laminations.

5. Alternative Insulator Mounting

In an alternative embodiment, the pin-type anchoring protrusions 70, 370 on the insulators 20, 30, 320, 330 may be eliminated, and the insulators 20, 30, 320, 330 may be mounted to respective sides of the stator core in another suitable manner. For example, the insulators 20, 30, 320, 330 may be mounted to the stator core using adhesive, clipping mechanism, clamping mechanism, local friction, or other mechanical interlocks.

6. Alternative PCBA Mounting

Figures 1, 17:
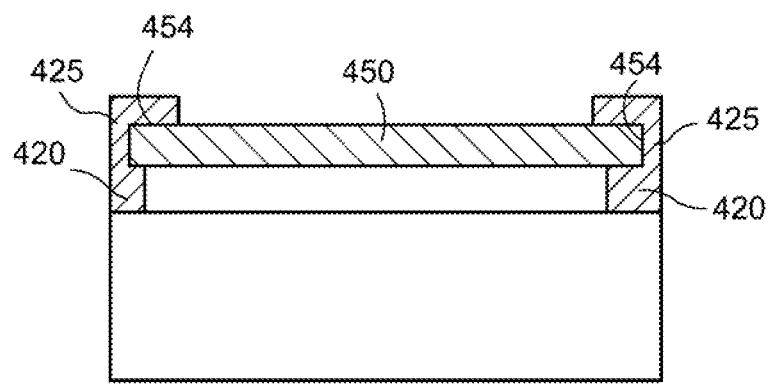
Figures 2, 17:
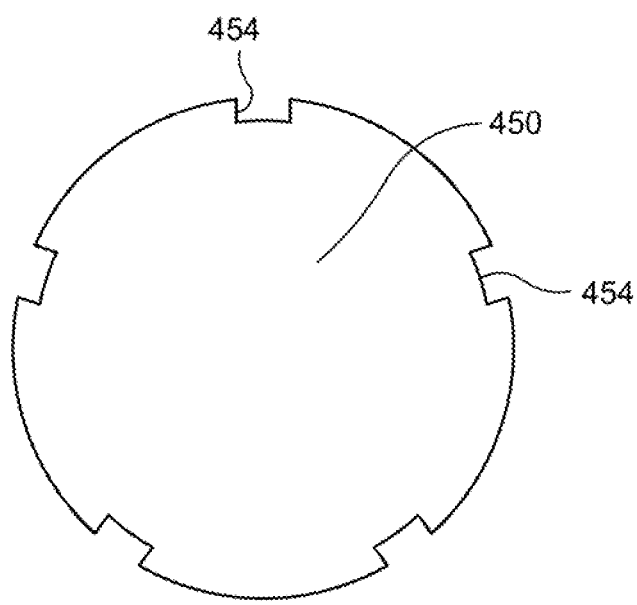

FIGS. 17-1 and 17-2 illustrate another embodiment for mounting the PCBA to the respective insulator. As illustrated, an insulator 420 may provide a plurality of protrusions or clips 425 along the outer edge thereof that are adapted to resiliently flex and engage within respective slots 454 provided in the outer edge of the PCBA 450. The clips 425 are structured to secure the PCBA 450 both laterally and axially. Similar to the above, the protrusions/slots may be unevenly spaced to ensure precise positioning and alignment of Hall sensors provided to the PCBA.

7. Stator Core for Rotor

Figure 18:
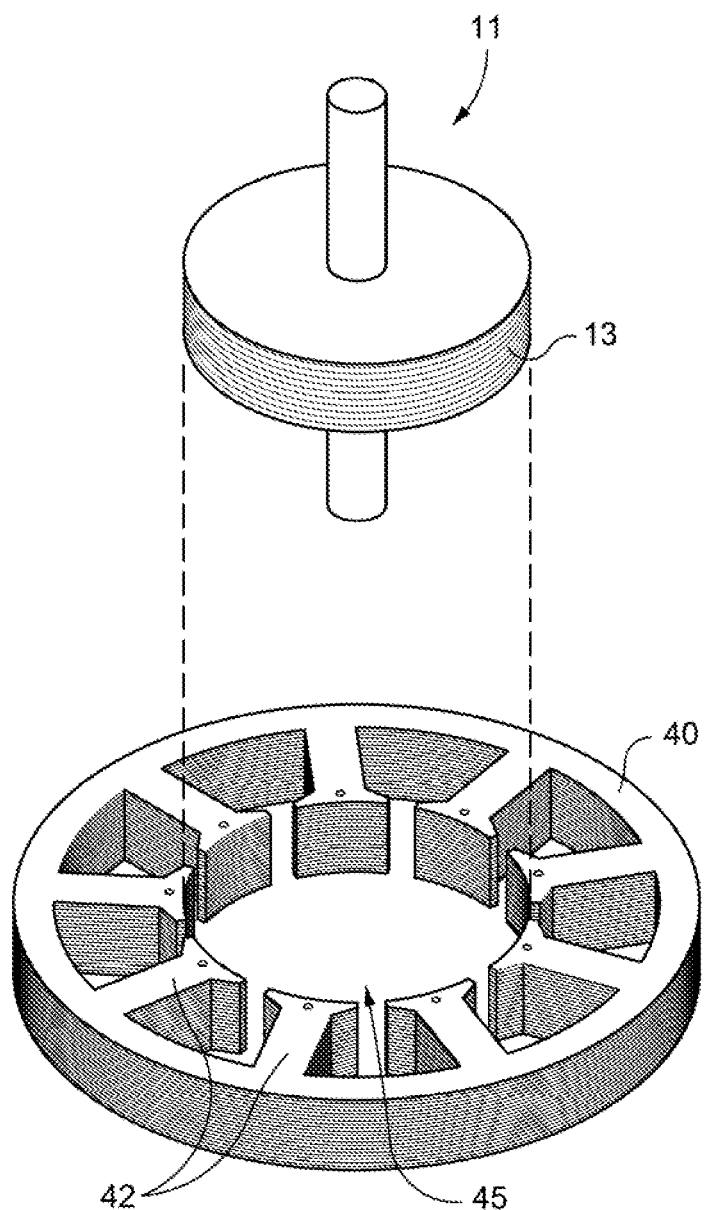
FIG. 18 illustrates a stator core and rotor according to an embodiment of the present invention.

As best shown in FIG. 18, the stator core 40 includes a plurality of laminations that are stacked and fixed to one another and then mechanically or laser cut to form the teeth 42 and inner cylindrical space 45 adapted to receive the magnet 13 of the rotor 11. In an embodiment, the cylindrical portion of the stator core 40 that is removed to form the cylindrical space 45 may be used as a rotor hub 13 of the rotor 11 that is adapted to accommodate a magnet or magnets. This arrangement provides a practical way to save material and hence manufacturing costs.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment. In addition, while the invention has particular application to patients who suffer from OSA, it is to be appreciated that patients who suffer from other illnesses (e.g., congestive heart failure, diabetes, morbid obesity, stroke, bariatric surgery, etc.) can derive benefit from the above teachings. Moreover, the above teachings have applicability with patients and non-patients alike in non-medical applications.

What is claimed is:

1. An insulator for a stator assembly including a stator core having a plurality of teeth, coils wound around the teeth, and a PCBA, the insulator comprising:

at least one insulator adapted to be mounted to the stator core and structured to insulate the stator core from the coils, each insulator including a main wall having a plurality of petals that correspond to a number of teeth on the stator core, said at least one insulator including structure to perform at least one additional function, wherein said structure includes a wire guide to guide cross-over wires that form a connection between coils, wherein the wire guide is provided along a periphery of the main wall and defines first and second slots adjacent each of the plurality of petals, each first slot being positioned and arranged to allow a cross-over wire to enter on one side of the associated petal and wrap around the petal and associated tooth to form the coil and each second slot being positioned and arranged to allow the cross-over wire to exit on the other side of the petal and cross-over to another coil, wherein the first and second slots adjacent a first petal include a same depth which is different than the depth of the first and second slots of the adjacent petal.

2. The insulator according to claim 1, wherein said structure includes a support member to support and/or locate the PCBA on the stator core.

3. The insulator according to claim 1, wherein said structure includes positioning structure to precisely position the PCBA with respect to the coils.

4. A brushless DC motor, comprising:
a magnetic rotor; and
a stator assembly adapted to control movement of the rotor, the stator assembly including a stator core having a plurality of teeth, coils wound around the teeth, a PCBA, and the insulator according to claim 1.

5. A flow generator for generating a supply of pressurized air to be provided to a patient for treatment, the flow generator comprising:
a housing;
a blower provided to the housing, the blower operable to provide a pressurized flow of air at an outlet,
wherein the blower includes at least one impeller and a motor according to claim 4 to drive the at least one impeller.

6. The insulator according to claim 1, wherein the first and second slots allow the cross-over wire to pass between the respective coil and an outer surface of the wire guide.

7. The insulator according to claim 1, wherein each of the petals project radially inwardly from the main wall.

8. The insulator according to claim 1, wherein the wire guide includes lateral flanges or hooks along a free end of the wire guide to maintain or capture the cross-over wires on an outer surface of the wire guide.

9. An insulator for a stator assembly including a stator core having a plurality of teeth, coils wound around the teeth, and a PCBA, the insulator comprising:
at least a first insulator adapted to be mounted to the stator core and structured to insulate the stator core from the coils,
the first insulator including a guide wall structured to guide cross-over wires that form a connection between coils,
wherein the guide wall defines a plurality of slots, each slot structured to allow a cross-over wire to pass between the respective coil and an outer surface of the guide wall,
wherein the slots are arranged in a stair step manner with different depths to organize the cross-over wires along the outer surface of the guide wall,
wherein the slots are arranged in pairs with a pair of slots provided adjacent each coil, and
wherein the pair of slots adjacent a first coil include a same depth which is different than the depth of the pair of slots associated with the adjacent coil.

10. The insulator according to claim 9, wherein the first insulator is adapted to be mounted to a first side of the stator core and further comprising a second insulator adapted to be mounted to a second side of the stator core opposite to the first side, the first and second insulators structured to insulate the stator core from the coils.

11. The insulator according to claim 9, wherein each insulator includes a main wall having a plurality of petals that correspond to a number of teeth on the stator core, each of the petals project radially inwardly from the main wall.

12. The insulator according to claim 11, wherein the guide wall is provided along a periphery of the main wall.

13. The insulator according to claim 9, wherein the guide wall includes lateral flanges or hooks at edges of the guide wall.

14. The insulator according to claim 9, wherein the guide wall is angled from perpendicular with respect to a main wall.

15. The insulator according to claim 14, wherein the guide wall is angled about 0.5-5° from perpendicular with respect to the main wall.

16. The insulator according to claim 9, wherein the depth of each slot corresponds to a spacing of a lower edge of the slot from a main wall of the insulator.

17. A brushless DC motor, comprising:
a magnetic rotor; and
a stator assembly adapted to control movement of the rotor, the stator assembly including a stator core having a plurality of teeth, coils wound around the teeth, a PCBA, and the insulator according to claim 9.

18. A flow generator for generating a supply of pressurized air to be provided to a patient for treatment, the flow generator comprising:
a housing;
a blower provided to the housing, the blower operable to provide a pressurized flow of air at an outlet,
wherein the blower includes at least one impeller and a motor according to claim 17 to drive the at least one impeller.

* * * * *